(12) United States Patent
Joo

(10) Patent No.: US 7,421,799 B2
(45) Date of Patent: Sep. 9, 2008

(54) REMOTE CENTER COMPLIANCE DEVICE WITH ONE ELASTIC BODY

(76) Inventor: Sang-Wan Joo, 104-1302, Jugong Greenvill Apt., Seoksu-dong, Manan-gu, Anyang-si, Gyeonggi-do (KR)

( * ) Notice: Subject to any disclaimer, the term of this patent is extended or adjusted under 35 U.S.C. 154(b) by 0 days.

(21) Appl. No.: 11/766,590

(22) Filed: Jun. 21, 2007

(65) Prior Publication Data

US 2007/0294903 A1    Dec. 27, 2007

(30) Foreign Application Priority Data

Jun. 22, 2006    (KR)    ............... 10-2006-0056211
Jun. 22, 2006    (KR)    ............... 10-2006-0056213

(51) Int. Cl.
*G01D 21/00*    (2006.01)
*G01B 5/25*    (2006.01)
(52) U.S. Cl. ............................ 33/644; 33/613; 33/520
(58) Field of Classification Search ........... 33/644–645, 33/613, 655, 520
See application file for complete search history.

(56) References Cited

U.S. PATENT DOCUMENTS

| 4,627,169 | A | * | 12/1986 | Zafred et al. | ............... 33/644 |
| 4,848,757 | A | * | 7/1989 | De Fazio | ............... 33/644 |
| 5,836,083 | A | * | 11/1998 | Sangwan | ............... 33/644 |
| 6,473,985 | B2 | * | 11/2002 | Won et al. | ............... 33/644 |
| 6,792,689 | B2 | | 9/2004 | Joo et al. | |
| 2001/0018804 | A1 | * | 9/2001 | Won et al. | ............... 33/644 |

FOREIGN PATENT DOCUMENTS

KR    10-2001-0085013 A    9/2001

* cited by examiner

Primary Examiner—Yaritza Guadalupe-McCall
(74) Attorney, Agent, or Firm—Rabin & Berdo, P.C.

(57) ABSTRACT

A remote center compliance device with one elastic body is provided. In the remote center compliance device, an elastic center can be formed using one elastic body and the adjustment of the elastic center is easy. Further, since the number of parts is minimized, a manufacturing cost and a manufacturing process are reduced and an efficiency of installation space is maximized, thereby improving product competitiveness.

21 Claims, 27 Drawing Sheets

REMOTE CENTER COMPLIANCE DEVICE WITH ONE ELASTIC BODY

BACKGROUND OF THE INVENTION

1. Field of the Invention

The present invention relates to a remote center compliance device. More particularly, the present invention relates to a remote center compliance device with one elastic body, in which an elastic center can be formed using one elastic body and the adjustment of the elastic center is easy. Further, since the number of parts is minimized, a manufacturing cost and a manufacturing process are reduced and an efficiency of installation space is maximized, thereby improving product competitiveness.

2. Description of the Related Art

Generally, a remote center compliance device is a device that makes it easy to perform an assembly work by correcting a center error between a boss and an axis during an insertion work of the boss and axis by using an elastic enter principle.

The elastic center principle is a mechanical principle that when an elastic center is located near an object confined in the remote center compliance device and an external force acting on the object passes through the elastic center, the object supported to the remote center compliance device performs only a translation in a direction of the external force without any rotation and, when a moment acts on the elastic center, the object performs only a rotation centering on the elastic center without any translation.

FIG. 1 is a front view illustrating a center error and a repulsive force between parts during an assembly process in a conventional remote center compliance device, and FIG. 2 is a front view illustrating a center error correcting process and an assembly process in a conventional remote center compliance device.

Referring to FIGS. 1 and 2, the conventional remote center compliance device 1 includes upper and lower structures 2 and 3 and a plurality of elastic bodies 4 provided between the upper and lower structures 2 and 3.

Upon operation of the conventional remote center compliance device, when a shaft 6 held by a grippe 8 attached to the bottom of the lower structure 3 is moved downward in a direction V so as to insert it into a shaft hole 7 a front end of the shaft 6 1-point contacts a champered portion of the shaft hole 7.

At this point, the contact force R between the parts is defined by a horizontal component force Rx and a vertical component force Rz. When the remote center compliance device is designed such that its elastic center P is placed at an end of a part, the horizontal component force Rx passes through the elastic center P, so that the shaft 6, the gripper 8 and the lower structure 3 perform only a translation in horizontal direction without causing a rotation.

Therefore, the shaft 6 is inserted into the shaft hole 7 while performing a translation within a center error (e) with respect to the shaft hole 7.

When a precise part such as a precise shaft, a pin, and a bearing is inserted by an industrial robot or a dedicated assembly apparatus using the above-described remote center compliance device, an excessive insertion force which may occur due to a center error or angle error between assembly parts can be prevented in advance. Therefore, d\part damages can be suppressed, product quality and work efficiency can be improved, and a high-precision assembly line can be co constructed at a low cost.

However, the conventional remote compliance device has drawbacks in that it is difficult to correctly adjust the elastic center P, which is the essence of the elastic center principle, the number of parts is large, and the manufacturing and assembly processes are complicated.

The process error is caused by the manufacture error of the parts, i.e., the upper and lower structures 2 and 3 and a plurality of elastic bodies 4, and the cumulative error is caused by an assembly error generated when the parts are assembled. Therefore, the elastic center P calculated in the initial design and the elastic center P after the assembly are moved by the cumulative error. In this case, when the elastic centers P are not correctly adjusted, the shaft 6 below the lower structure 3 performs a rotation without any translation. Hence, the error (e) between the centers of the shaft 6 and the shaft hole 7 is not corrected; rather, a jamming phenomenon at the entrance of the shaft hole occurs.

In particular, the elastic bodies 4 are manufactured by stacking a plurality of metal disks at constant intervals and filling a rubber between the stacked metal disks. A stack error occurs when the plurality of metal disks are stacked. Further, due to the use of the elastic disks 4 having the stack error, it is difficult to fin the elastic center P on a line of the central shaft of the remote center compliance device.

Moreover, during the insertion process of inserting the precise parts such as a precise shaft, a pin, and a bearing, it is difficult to measure the insertion force for the insertion process. Therefore, the precise parts are damaged by a new excessive insertion force. During the error correction for matching the center, the measurement of the error value of the remote center compliance device for the error correction is difficult. Hence, the error must be always corrected.

SUMMARY OF THE INVENTION

An object of the present invention is to provide a remote center compliance device with one elastic body, in which a cumulative error due to a manufacture error and an assembly error is minimized by the minimum number of parts, whereby the elastic center can be easily adjusted.

Another object of the present invention is to provide a remote center compliance device with one elastic body, in which a measuring sensor that can measure a force-insertion force or location error correction amount is provided at a limiter, a measuring block, or an elastic body.

According to an aspect of the present invention, there is provided a remote center compliance device for correcting a center error between a boss and a force-insertion part through a translation based on an elastic center principle includes: upper and lower structures; a plurality of disks having a predetermined slope; first and second supports stacked at predetermined distance and disposed on both ends of the disks, the first and second supports including a protrusion and a recess having the same slope and a plurality of coupling holes; and an elastic body including a filler for elastically connecting the disks stacked between the first and second supports, the elastic body being fixed to the upper and lower structures through the coupling holes.

The disk (212) has the slope (θ) inclined from an inner side to an outer side.

The upper and lower structures (310, 320) may be disposed in the first and second supports (214, 216) of the elastic body (210) and connected together by a coupling member.

A limiter (30) may be disposed between the upper and lower structures (310, 320), the limiter (30) including a screw part (336) fixed to one of the upper and lower structures (310, 320), and a head part (332) for spacing the other of the upper and lower structures (310, 320) by a predetermined distance, such that the elastic body (210) is prevented from buckling and damage due to a tensile force and a force-insertion force caused by weight of the limiter 30.

The upper structure (310) may include a plurality of coupling holes at the upper portion (312), a flange (314) extending downward, and a receiving space (316) defined by an inner side of the flange (314), the receiving space (316) receiving the elastic body (210) and being connected to the first support (214) of the elastic body (210), such that the elastic body (210) is not interfered during a translation movement.

The lower structure (320) may be coupled to the second support (216) of the elastic body (210) and disposed in the receiving space (316) of the flange (314), such that the lower structure (320) is spaced apart from the inner wall of the flange (314) in order for the elastic body (210) not to contact the inner wall of the flange (314) during the translation movement of the elastic body (210).

A plurality of wrench grooves (338) may be formed at the head part (332) of the limiter (30) and into which a wrench is inserted to transfer a coupling force to make an easy connection of the screw (336) to one of the upper and lower structures (310, 320).

The upper structure (310) may include protrusions (314a) at a lower portion, the protrusions (314a) having an insertion space recessed upward from an end portion.

The lower structure (320) may include a lower portion (322), a protrusion (324) producing from the lower portion (322) to a predetermined height, a coupling hole (326) defined in the center of the protrusion (324), and a plurality of rotation preventing members (328) inserted into the insertion space of the protrusion (314a) at a periphery of the lower portion (322).

The limiter (30) may further include a force-insertion force measuring sensor (40).

A location displacement measuring unit may be disposed between the upper and lower structures (13, 14) to measure a relative location displacement between the upper and lower structures (13, 14).

The location displacement measuring unit may include a measuring sensor for measuring a correction amount using an elastic plate.

The location displacement measuring unit may include a plurality of slide-type displacement measuring sensors arranged in perpendicular to one another.

The measuring block may includes: a fixing portion (112) fixed to the upper structure (13); and a measuring portion (114) disposed under the fixing portion (112) and fixed to a location close to the lower structure (14), with being spaced apart to a predetermined height by an allowable deformation gap (116), the measuring portion (114) providing the force-insertion force measuring sensor (40).

The measuring block includes: a fixing portion (522) fixed to the bottom of the upper structure (13); and a cross-shaped measuring portion (524) disposed under the fixing portion (522).

The fixing portion (522) may include a protrusion (526) in the center and is tightly connected to a bottom surface (13b) of the upper structure (13), a recess surface (528) is formed in a direction of the measuring portion (524), and the measuring sensor (40) is attached to the recess surface (528).

A displacement sensor may be provided at one of the upper and lower structures (13, 14) to measure a displacement of the limiters.

The force-insertion force measuring sensor may include one of an electrical strain gage and a piezo-electric element.

The location displacement measuring unit includes one of a potentiometer, a linear scale, and an LVDT.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Embodiments of the present invention will be described below in detail with reference to the accompanying drawings.

Embodiment 1

One Elastic Body according to a First Embodiment of the Present Invention

Figure 1:
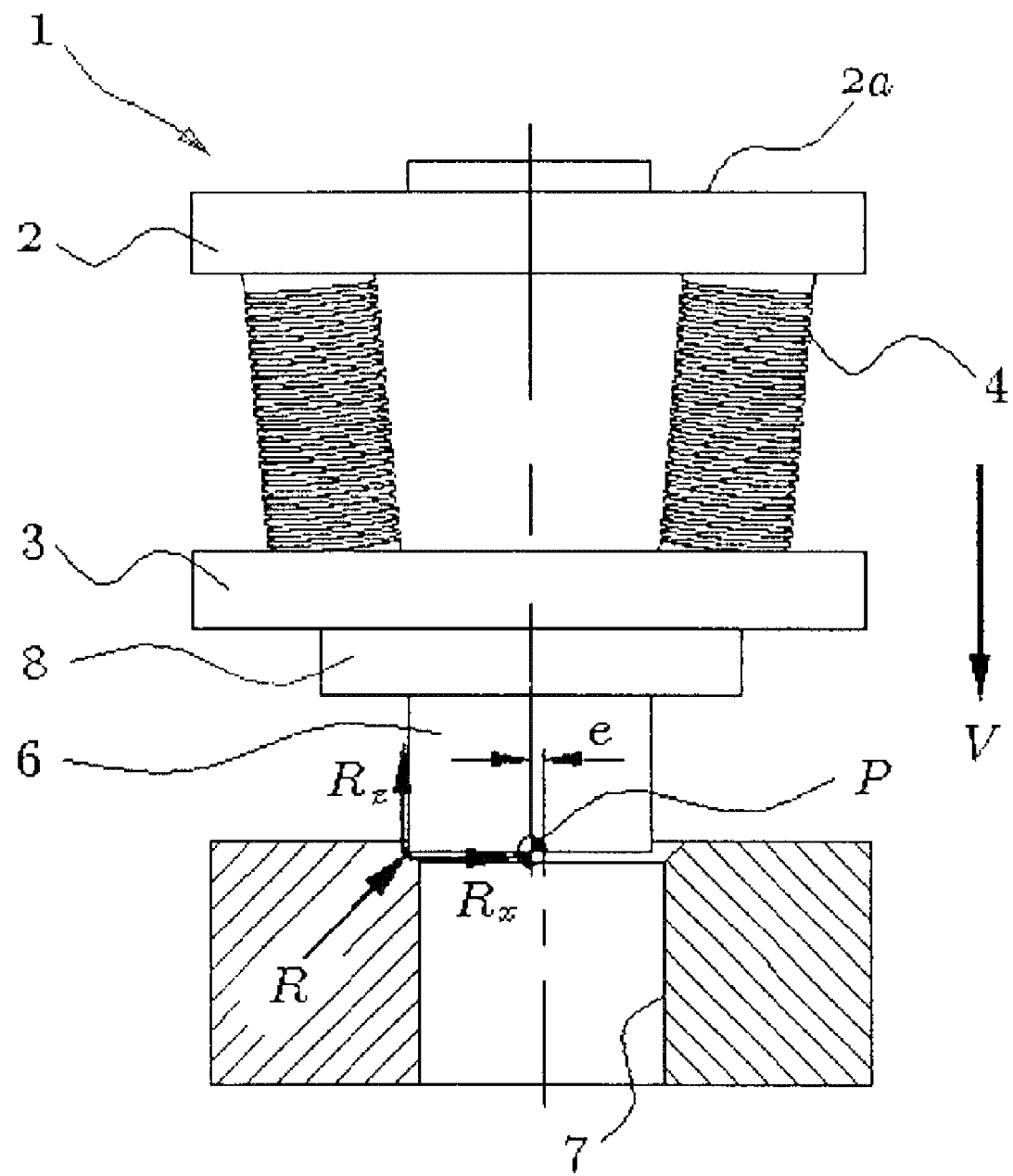
FIG. 1 is a front view illustrating a center error and a repulsive force between parts during an assembly process in a conventional remote center compliance device.
Figure 2:
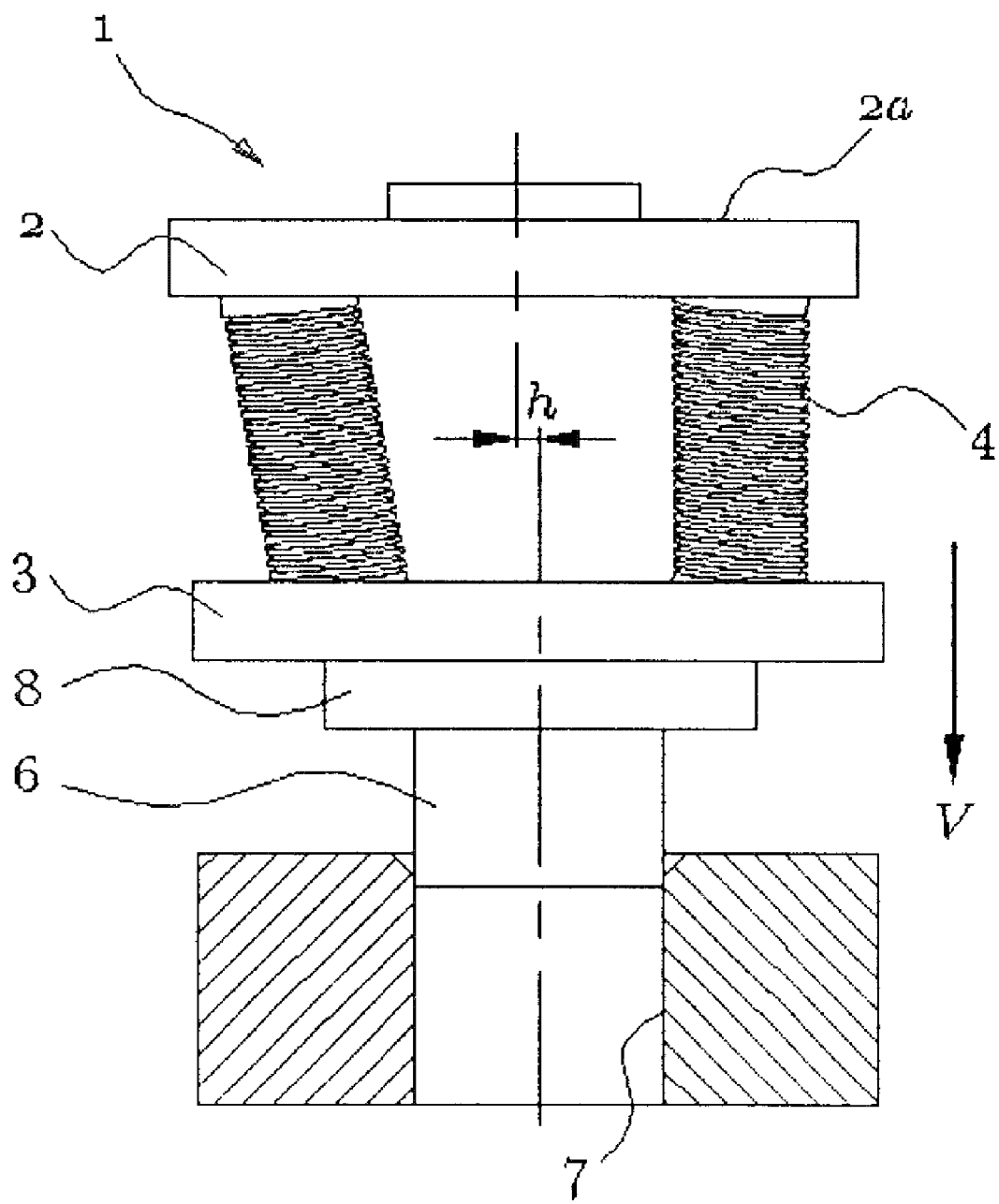
FIG. 2 is a front view illustrating a center error correcting process and an assembly process in a conventional remote center compliance device.
Figure 3:
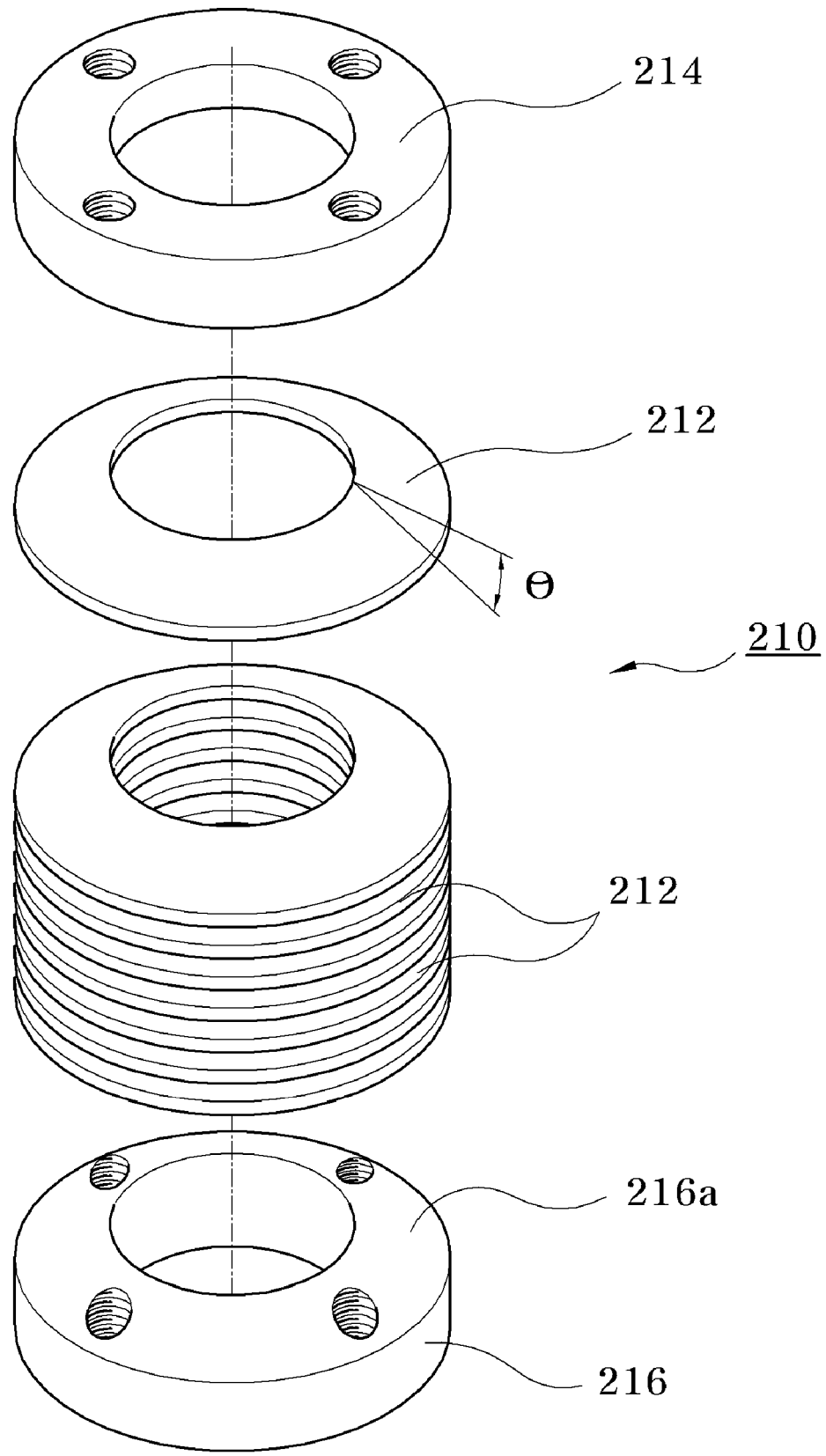
FIG. 3 is a partial exploded perspective view of an elastic body according to a first embodiment of the present invention.
Figure 4:
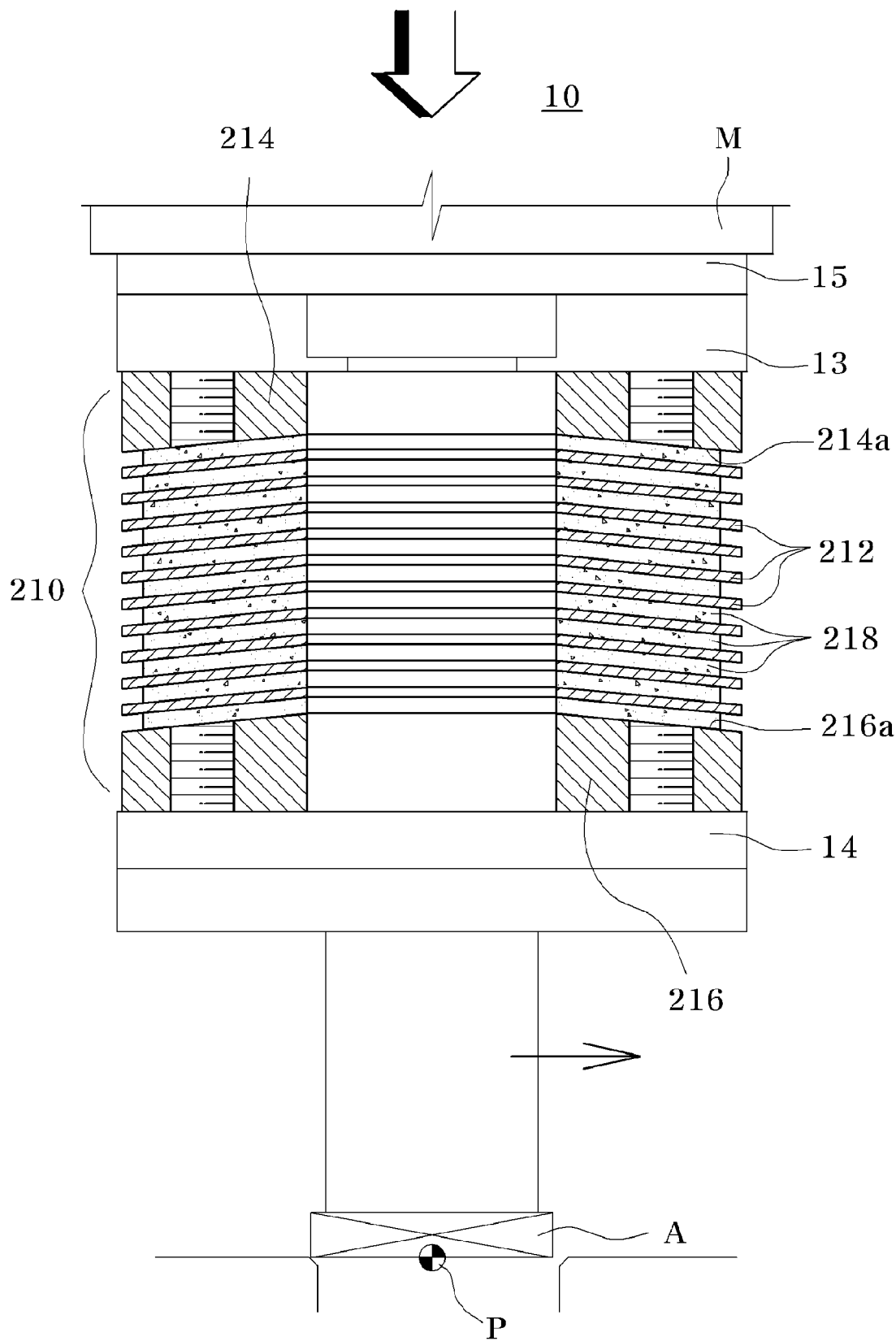
FIG. 4 is an assembled cross-sectional view of the remote center compliance device shown in FIG. 3.

FIG. 3 is a partial exploded perspective view of an elastic body according to a first embodiment of the present invention, and FIG. 4 is an assembled cross-sectional view of the elastic body according to the first embodiment of the present invention.

Referring to FIGS. 3 and 4, the elastic body 210 includes a plurality of disks 212 stacked at constant intervals, first and second supports 214 and 216 provided on both sides of the disks 212 and spaced apart from one another, and a filler 218 filled between the first and second supports 214 and 216 and the disks 212 to elastically connect them.

The disk 212 has a through hole in the center and has an outer periphery inclined with a predetermined slope ($\theta$). Preferably, the slope ($\theta$) ranges from 2° to 15°. The location of the elastic center point P disclosed in Korean Patent Laid-open Publication No. 2001-85013 is changed according to the angle of the slope ($\theta$). Therefore, the location of the elastic center point P is approximately selected.

When it is assumed that the elastic center point is located at a lower portion, the slope direction of the disk 212 is directed downward from an inner side to an outer side, that is, in a crossing direction of straight lines with respect to the slope.

The first and second supports 214 and 216 have the same slope ($\theta$) on both sides of the disks 212 and are spaced apart from each other by a predetermined distance. As illustrated in FIG. 22, the recessed portion 214a is formed in the first support 214, and the protrusion 216a is formed in the second support 216.

A plurality of coupling holes are formed in the first and second supports 214 and 216 and couple the respective parts or devices.

The filler 218 is formed of a rubber having an excellent elastic force. However, the present invention is not limited to the rubber. In some cases, a synthetic resin having an excellent elastic force can be used as the filler 218.

An operation of the remote center compliance device with one elastic body according to the first embodiment of the present invention will be described below.

The first support 214 is fixed to the bottom of the upper structure 13 connected to the upper cover 15 by the coupling member, and the second structure 216 is fixed to the lower structure 14 having a force-insertion frame holding the force-insertion part A.

At this point, the elastic body 210 is designed such that its elastic center P is placed at an end of the part A held by the force-insertion frame.

The elastic body 210 falls down by the descending force of the lifter M and inserts the part A into the boss B forcibly. When a center error exists between the boss B and the part A, the part A can be easily force-inserted into the boss B by matching the part A and the boss B with respect to the central axis by the translation based on the elastic center principle of the elastic body 210.

In addition, the elastic center point of the elastic body 210 is changed according to the slope ($\theta$) of the disk 212, the number of the disk 212, and the distance, and can be differently set according to the devices using the elastic body 210.

Therefore, the elastic body 210 minimizes the cumulative error of the plurality of elastic bodies, which is the problem of the conventional remote center compliance device, and thus the elastic center point due to the elastic body 210 can be easily adjusted. The force-insertion force measuring sensor 40 provided in the limiter 30 or the force-insertion force measuring sensor 40 separately provided under the top cover 15 disposed above the limiter calculates the force-insertion force, and the displacement sensor 42 calculates the location error correction value. The calculated force-insertion force and location displacement values are outputted on the external display device (not shown).

As the number of parts is considerably decreased by the single elastic body, the manufacturing process and cost are significantly reduced. In addition, the reduction of the installation space improves the space utilization, thereby increasing the product competitiveness.

Embodiment 2

One Elastic Body According to a Second Embodiment of the Present Invention

Figure 5:
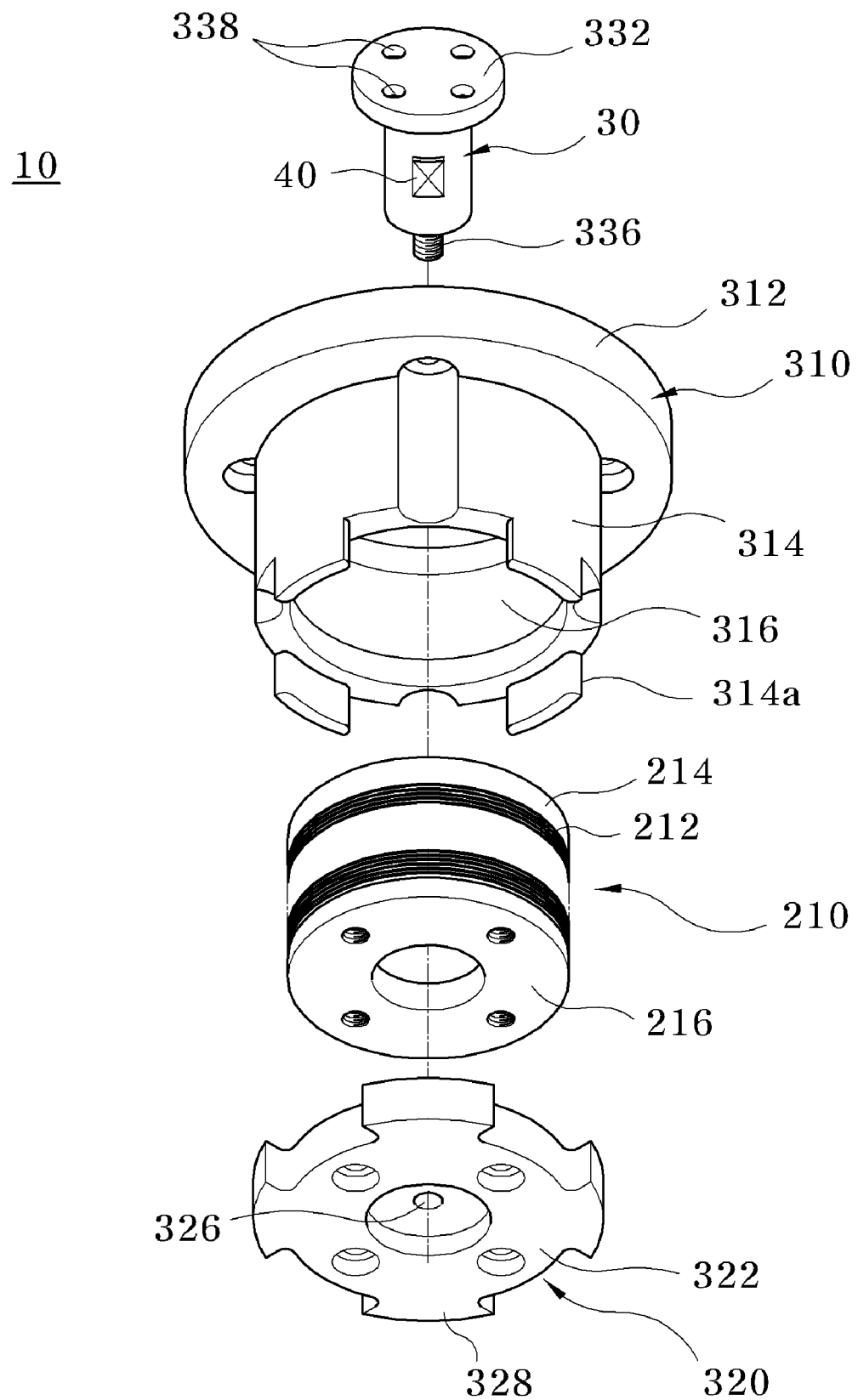
FIG. 5 is an exploded perspective view of a remote center compliance device according to a second embodiment of the present invention.
Figure 6:
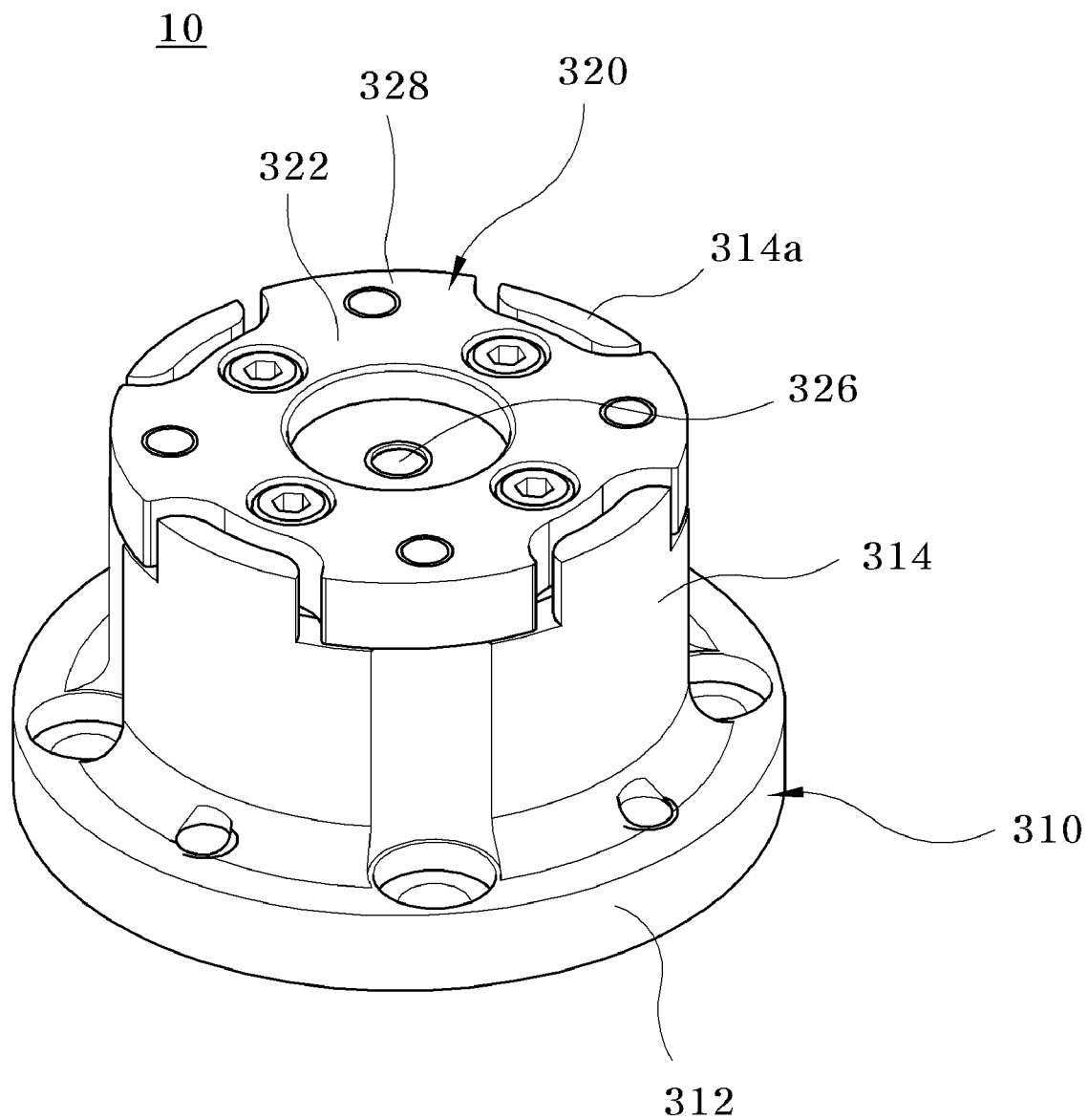
FIG. 6 is a bottom perspective view illustrating the assembled state of FIG. 5.
Figure 7:
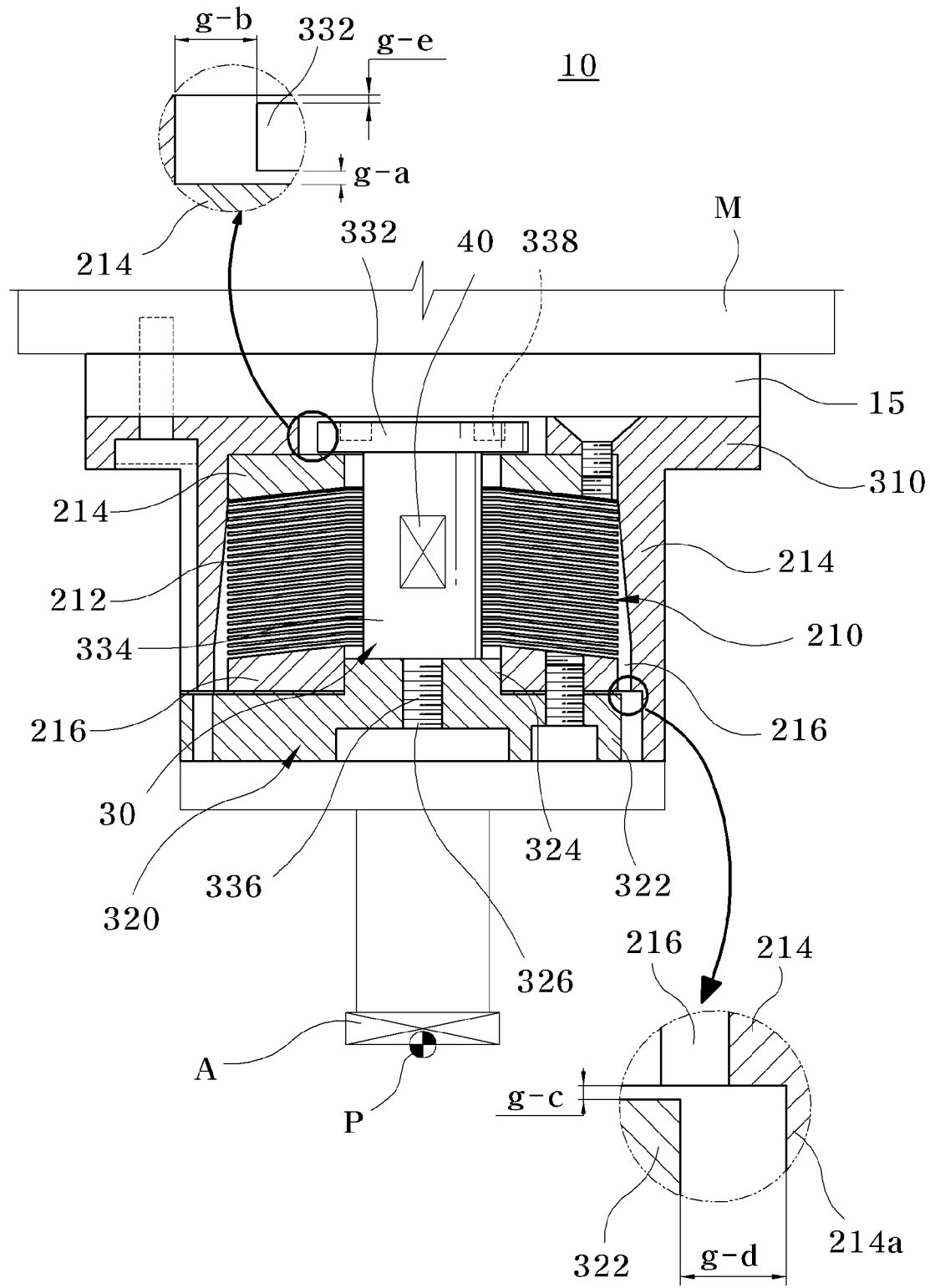
FIG. 7 is an assembled cross-sectional view of the remote center compliance device shown in FIG. 5.

FIG. 5 is an exploded perspective view of a remote center compliance device with one elastic body according to a second embodiment of the present invention, FIG. 6 is an assembled cross-sectional view of the remote center compliance device shown in FIG. 5, and FIG. 7 is an assembled cross-sectional view of the remote center compliance device shown in FIG. 5.

Referring to FIGS. 5 to 7, the remote center compliance device includes an elastic body 210, upper and lower structures 310 and 320 fixed to upper and lower portions of the elastic body 210, and a limiter 30 provided between the upper and lower structures 310 and 320.

Since the elastic body 210 has the same structure as that of the first embodiment of the present invention, its detailed description will be omitted.

The upper structure 310 includes an upper portion 312 and a flange 314. The upper portion 312 of the upper structure 310 has a plurality of coupling holes, and the flange 314 extends downward from the upper portion 312. A receiving space 316 where the elastic body 210 is received is formed inside the flange 314. A through hole (not shown) is formed to communicate with the receiving space 316 in the upper portion 312.

In addition, the upper portion of the elastic body 210 is coupled to the upper portion of the receiving space 316 by a coupling member, and the elastic body 210 is formed so large that the translation range is not interfered.

Protrusions 314a are formed radially under the flange 314 at constant intervals and define insertion spaces recessed to a predetermined depth.

The lower structure 320 includes a lower portion 322 and a protrusion 324. The protrusion 324 protrudes upward from the center and has a coupling hole 326 in the center. In addition, a plurality of coupling holes are formed in the lower portion 322 and are connected to a coupling member for fixing the lower portion of the elastic body 210.

Rotation preventing members 328 are formed radially at constant intervals around the periphery of the lower portion 322 of the lower structure 320. The rotation preventing members 328 are inserted into the insertion spaces of the protrusions 314a formed in the lower portion of the upper structure 310.

Preferably, the limiter 30 includes a head 332, a shaft 334 extending downward from the head 332, a force-insertion force measuring sensor 40 disposed at one side of the shaft 334, a male screw 336 disposed at a lower portion of the shaft 334.

More preferably, the male screw 336 of the limiter 30 is coupled to the coupling hole 326 of the lower structure 320. A plurality of wrench grooves 338 are formed at the head 332 to release or lock the limiter 30.

An assembly relationship of the remote center compliance device will be described below.

The elastic body 210 is inserted into the receiving space 316 of the upper structure 310 and the inner upper portion of the receiving space 316 is closely attached to the upper portion of the elastic body 210, and they are coupled by the coupling member.

The lower structure 320 is disposed under the upper structure 310, and the coupling members are coupled through the coupling holes formed in the lower portion 322 of the lower structure 320. The lower portion of the elastic body 210 fixed to the upper structure 310 is coupled and fixed.

Referring to FIG. 6, a predetermined gap is formed between the insertion spaces of the protrusion 314a and the rotation preventing members 328 in such a state that the rotation preventing members 328 are inserted into the insertion spaces of the protrusion 314.

In addition, in such a state that the upper and lower structures 310 and 320 are assembled, the limiter 30 is inserted through the through hole (not shown) and the male screw 336 of the limiter 30 is coupled to the coupling hole 326 of the lower structure 320. Therefore, the limiter 30 is assembled vertically in the center of the upper and lower structures 310 and 320.

It is preferable that a predetermined assembly gap is formed during the assembly of the upper and lower structures 310 and 320 and the limiter 30. When the elastic body 210 conducts the translation movement based on the elastic center principle, the upper and lower structures 310 and 320 and the limiter 30 are smoothly moved.

Referring to FIG. 7, the assembly gap of the upper and lower structures 310 and 320 and the limiter 30 includes an allowable tension gap (g-a) between the upper portion of the elastic body 210 and the lower portion of the head 332 of the limiter 30, an allowable compression gap (g-e) between the lower surface of the through hole (not shown) of the upper structure 310, and the allowable translation gap (g-b) caused by difference between an inner diameter of the protrusion 314a of the flange 314 and an outer diameter of the lower structure 320.

In addition, the assembly gap includes an allowable compression gap (g-c) between an end of the flange 314 and the upper surface of the lower structure 320, and a translation gap (g-d) caused by difference between an inner diameter of the protrusion 314a of the flange 314 and an outer diameter of the lower structure 320.

The tension and compression gaps (g-a, g-c, g-e) form a gap so as to make the translation movement possible during the translation movement of the elastic body 210. In addition, the elastic body 210 is prevented from being buckled or damaged by preventing the tensile force caused by the weight or the compression force caused by the force insertion from continuously acting on the elastic body 210.

Preferably, the tension or compression gaps (g-a, g-c, g-e) range from 0.1 mm to 0.2 mm.

When the elastic body 210 conducts the translation movement based on the elastic center principle, the translation gaps (g-b, g-d) are formed such that the translation movement of the limiter 30 and the lower structure 320 does not interfere the upper structure 310.

In such a remote center compliance device, the upper structure 310 is coupled and fixed to the lower portion of the lifter M, and the force-insertion frame is fixed to the lower portion of the lower structure 320.

If the center error occurs when the part A is forces-inserted into the boss B due to the descending of the lifter M, the center error is corrected by the elastic body 210 provided inside the upper structure 310. Thus, the part A is easily force-inserted into the boss B.

When the part A is force-inserted into the boss B, the force-insertion force is generated. The generated force-insertion force acts on the lower structure 320 and the elastic body 210. Due to the force-insertion force, the lower structure 320 ascends, and the elastic body 210 conducts the translation movement based on the elastic center principle, while the lower structure 320 rises up by the compression gas (g-c) between the lower portion of the upper structure 310 and the upper portion of the lower structure 320. Then, the lower and upper portions of the upper and lower structures 310 and 320 are closely contacted with each other. Hence, this can prevent the bad influence of the force-insertion force on the elastic body 210, thereby preventing the damage of the elastic body 210.

In the assembly of the upper and lower structures 310 and 320, the rotation preventing members 328 of the lower structure 320 maintaining the state in which they are inserted into the insertion spaces of the protrusions 314a prevents the endless displacement of the elastic body 210 due to the distortion or the X-axis and Y-axis working force during the translation movement based on the elastic center principle of the elastic body 210.

Embodiment 3

A Measuring Sensor Attached to One Elastic Body

The third embodiment of the present invention relates to a remote center compliance device in which a measuring sensor that can measure the force-insertion force of the force-insertion apparatus is provided at a limiter.

Figure 8:
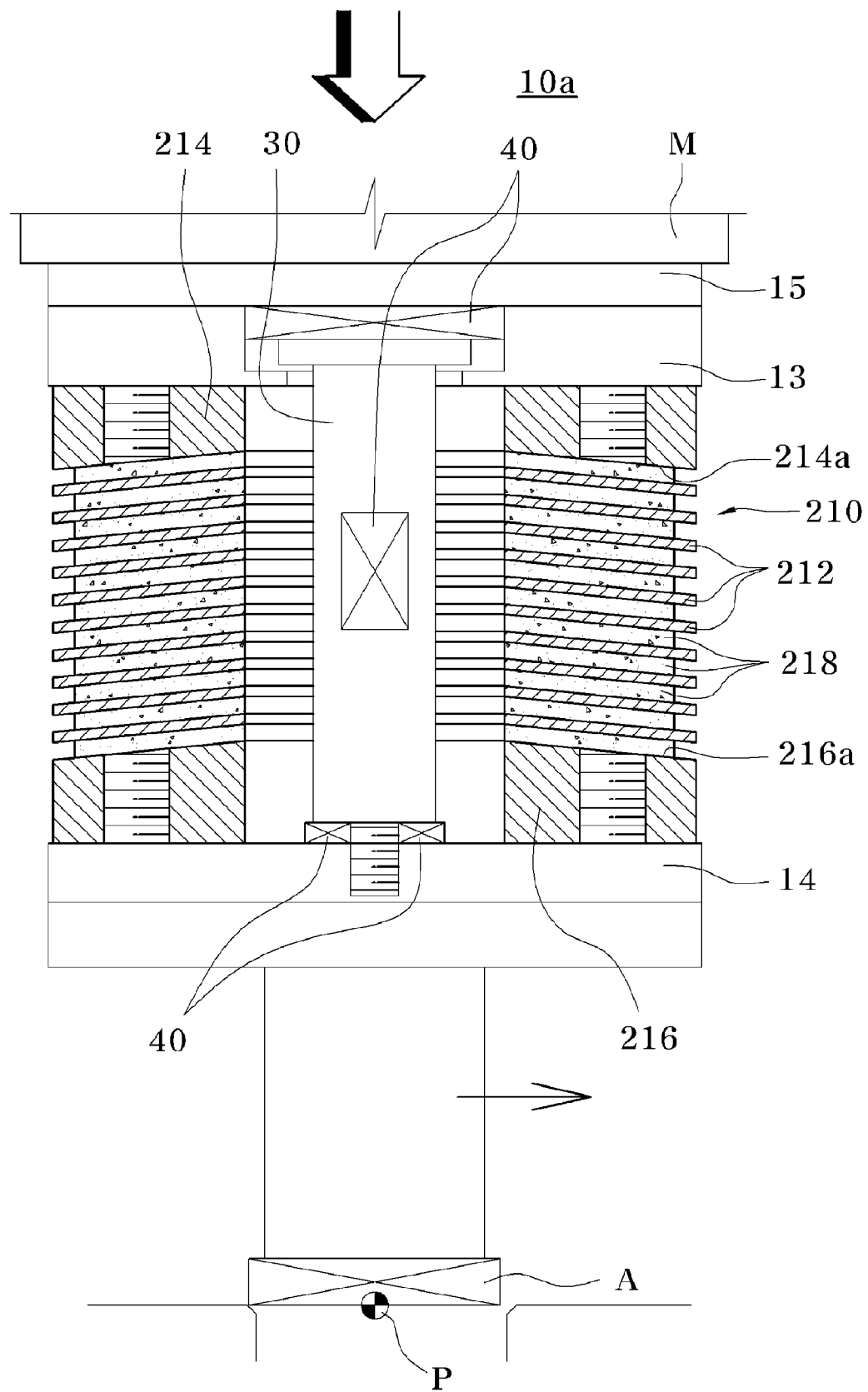
FIG. 8 is a cross-sectional view of a force-insertion force measuring sensor attached to a limiter of the remote center compliance device according to an embodiment of the present invention.

FIG. 8 is an assembled cross-sectional view of the remote center compliance device with the force-insertion force measuring sensor attached to the limiter 30. Referring to FIG. 8, the limiter 30 is additionally provided under the upper cover 15, and the force-insertion force measuring sensor 40 is inserted and fixed to the side of the limiter 30, or between the limiter 30 and the lower support 14, or above the head of the limiter 30, and measures the force-insertion force acting on the limiter 30.

The force-insertion force measuring sensor 40 may be configured with an electrical strain gage or a piezoelectric element that can detect a fine variation.

Referring to FIG. 8, the remote center compliance device 10 moves downward in order to forcibly insert the part into the boss. At this point, the force-insertion force is generated between the boss and the part. The generated force-insertion force is transferred to the limiter 30 through the part fixing frame arranged vertically and the lower structure 14.

When the elastic body 210 is compressed and rises to a predetermined height so that it is closely attached to the bottom of the lifter, the limiter 30 is compressed and deformed by the rising force-insertion force and the lower stopper of the lifter.

Therefore, the force-insertion force measuring sensor 40 calculates the variation and the force-insertion force according to the compressed and deformed amount, and the calculated force-insertion force is outputted on an external display device (not shown).

In case where the measuring sensor 40 is inserted and fixed between the limiter 30 and the lower support 14 or above the head of the limiter 30 and measures the force-insertion force of the limiter 30, it is preferable that the load cell is used as the force-insertion force measuring sensor 40.

Meanwhile, although not shown, the force-insertion force measuring sensor 40 can measure a variation of the limiter 30, calculate the force-insertion force, outputs the calculated force-insertion force on an external display device, and determines a success/fail of the press fit of the boss and the force-insertion part according to the calculated force-insertion force.

Embodiment 4

Figure 9A:
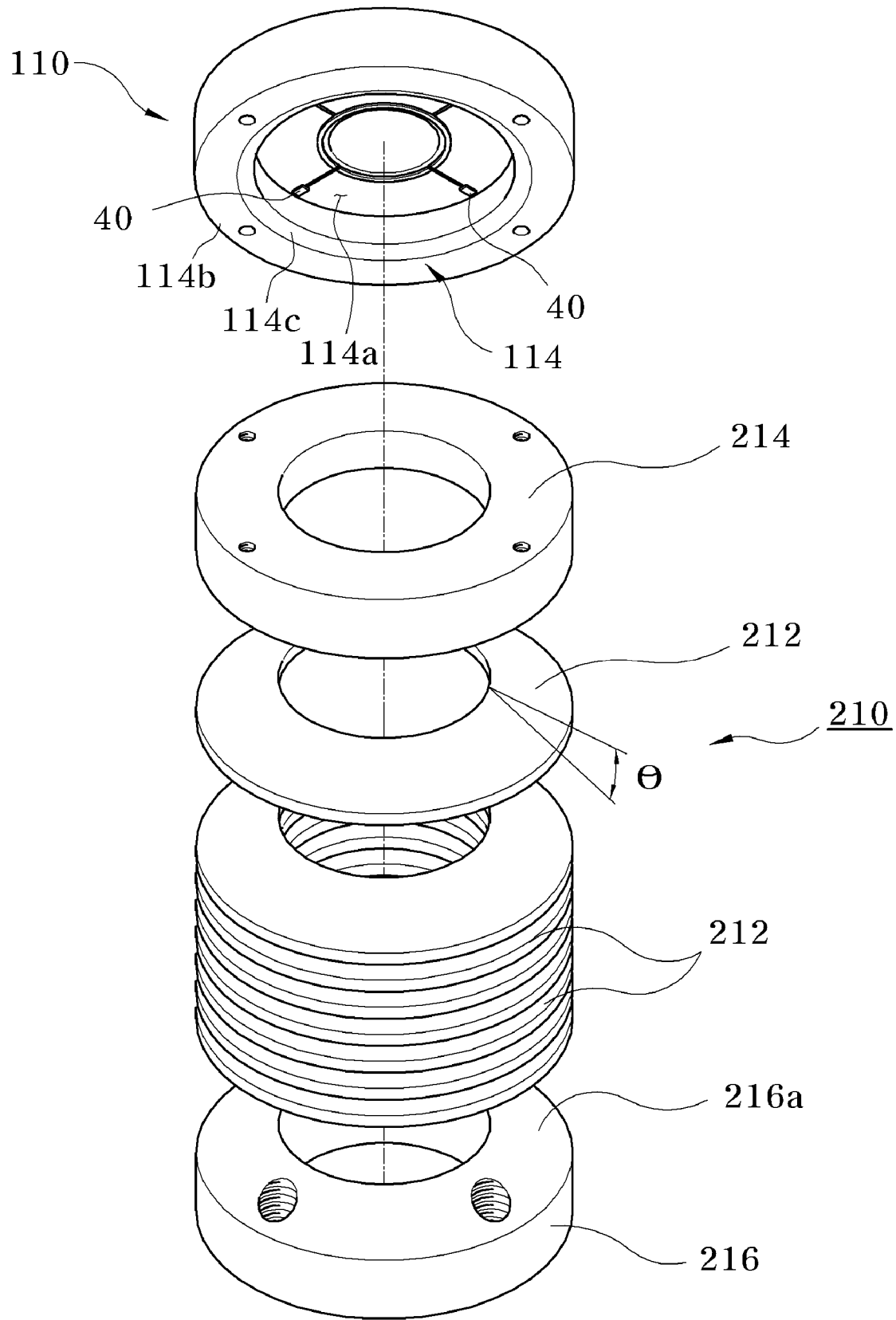
FIG. 9a is cross-sectional view illustrating a case that the first embodiment of the measuring block is applied to the elastic body according to the present invention.

First Embodiment of the Measuring Block is Applied to the Remote Center Compliance Device FIG. 9a is cross-sectional view illustrating a case that the first embodiment of the measuring block is applied to one elastic body according to the present invention.

The measuring block 110 includes a fixing portion 112 fixed to the bottom of the upper structure 13 by a coupling member, and a measuring portion 114 disposed under the fixing portion 112. Preferably, the fixing portion 112 and the measuring portion 114 are integrally formed such that they are spaced apart from each other by a predetermined distance by an allowable deformation gap 116 having a predetermined depth.

In addition, the allowable deformation gap 116 changes according to a material of the measuring block 110, a thickness of the measuring portion 114, and a depth of the allowable deformation gap 116. The allowable deformation gap 116 restricts an elastic limit range when the measuring portion 114 is bent by an force-insertion repulsive force. Therefore, the measuring portion 114 is made not to exceed the elastic limit range, so that it is not deformed.

In this case, the allowable deformation gap 116 is a fine gap ranging from approximately 0.1 mm to approximately 0.2 mm.

In addition, the measuring portion 114 has a recess 114a in the center, and a protrusion 114b in a periphery of the recess 114a. A force-insertion force measuring sensor 40 is provided at the recess 114a. The protrusion 114b is fixed to the first support 214 by a coupling member, e.g., a bolt.

Figure 9B:
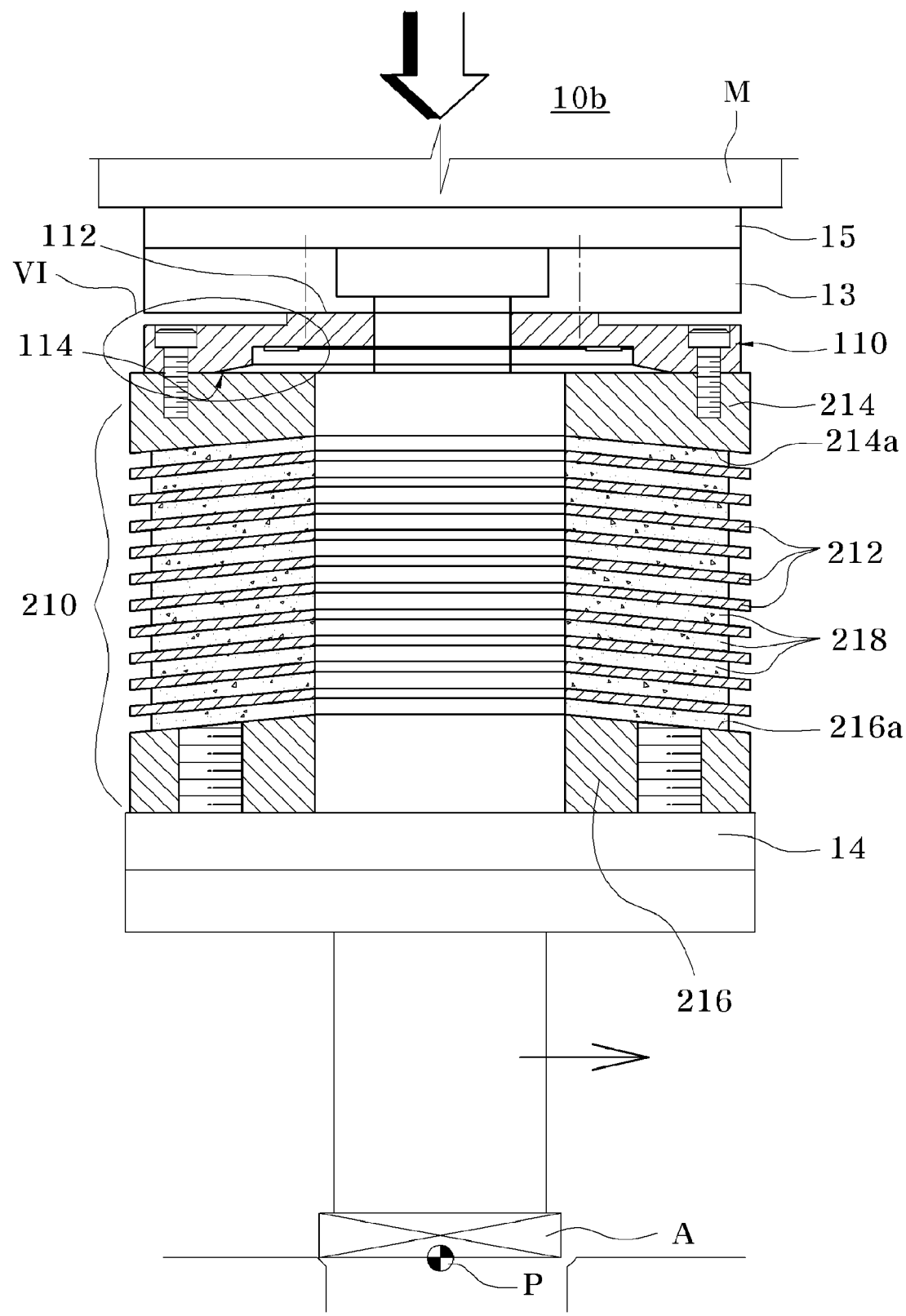
FIG. 9b is a cross-sectional view illustrating a usage state when the first embodiment of the measuring block is applied to the elastic body according to the present invention.
Figure 9C:
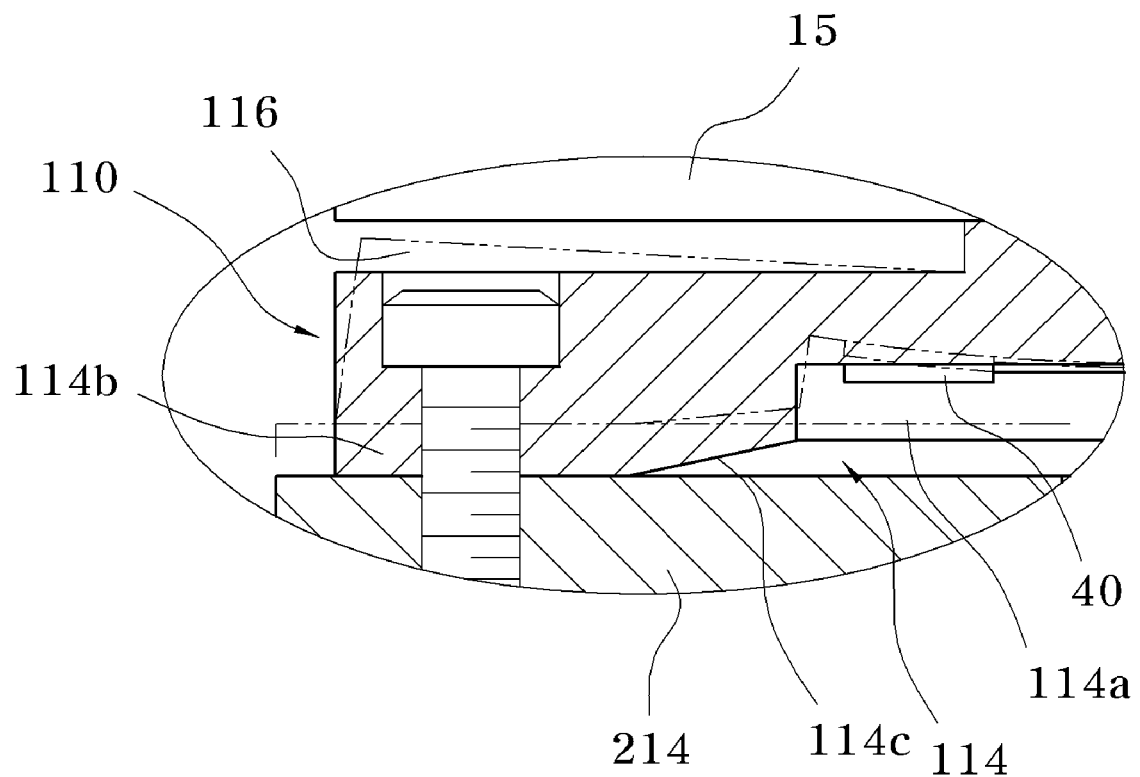
FIG. 9c is an enlarged view of a section VI of FIG. 9b.

FIG. 9c is an enlarged view of a section VI of FIG. 9b. Referring to FIG. 9c, the protrusion 114b has a sloped surface 114c so as to minimize the attached range between the first support 214 and the protrusion 114b. The sloped surface 114c is formed at a slope that rises inwards to a predetermined height from the outer end of the protrusion 114b.

When the protrusion 114b is closely attached to the lower structure 14, the protrusion 114b is bent by the force-insertion repulsive force acting on the lower structure 14. However, the contact location nearest from the center, that is, the inner surface of the protrusion 114b, becomes the application point of the repulsive force.

Therefore, the sloped surface 114c is formed in order to place the application point of the repulsive force at a location farthest from the center, that is, the periphery of the protrusion 114b. Since the center radius of the application point of the force-insertion force applied to the measuring portion 114 is always constant, the force-insertion force can be correctly calculated without the bending deformation amount of the measuring portion 114.

The upper structure 13 is fixed to the lifter 3 of the force-insertion apparatus, and a part fixing frame for holding the force-insertion part A is connected to the lower structure 14. Therefore, in the measuring block 110, the fixing portion comes in contact with the upper structure 13, and the measuring portion 110 is connected to the first support 214. The measuring block 110 can be installed upside down, regardless of locations where the force-insertion force is applied.

Preferably, a plurality of force-insertion force measuring sensors 40 are provided in X-axis and Y-axis directions in order for the correct measurement of the force-insertion force. However, the present invention is not limited to this configuration.

A method for measuring the force-insertion force or the location error correction amount will be described below with reference to FIGS. 9b and 9c.

The remote center compliance device is fixed to the lifter 3 of the force-insertion apparatus. The upper structure 13 is closely attached to the bottom of the lifter 3 and connected thereto by the coupling member.

The hydraulic pressure generated from the hydraulic pump of the hydraulic part 5 provided at one side of the force-insertion apparatus is transferred to the hydraulic cylinder, and the hydraulic cylinder drops the lifter 3 using a descending force The remote center compliance device 10a is fixed to the bottom of the lifter 3, and the part fixing frame is provided under the remote center compliance device 10a to fix the part A to be force-inserted into the boss B. The part A is force-inserted into the boss B by the descending part fixing frame.

At this point, when the center error occurs between the boss B and the part A, the force insertion is smoothly performed by the center error correction between the boss B and the part A. In addition, the force-insertion force is generated by the force insertion of the boss B and the part A.

The force-insertion repulsive force is transferred to the lower structure 14 through the part fixing frame. The repulsive force acting on the lower structure 14 is applied to the measuring portion 114 of the measuring block 110 closely attached to the top of the lower structure 14. Therefore, the measuring portion 114 is finely bent.

Therefore, the force-insertion force measuring sensor 40 provided in the recess 114a of the measuring portion 114 detects the deformation due to the fine bending and outputs the deformation rate on the external display device. Hence, the operator can determine if the boss B and the part A are force-inserted within the allowable error range.

Figure 9D:
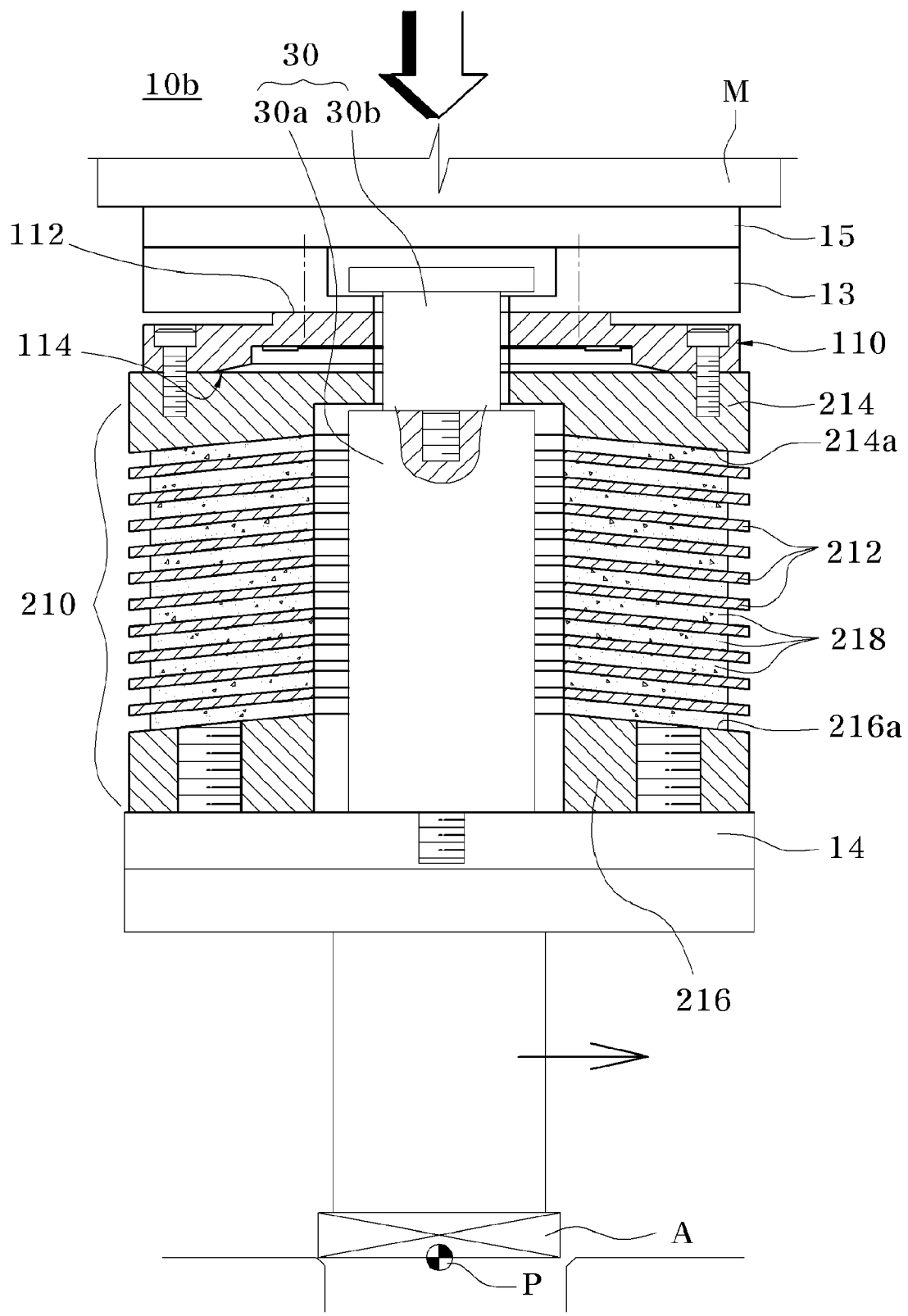
FIG. 9d is a cross-sectional view illustrating a case that a force-insertion force measuring sensor and a measuring block are applied to a limiter with one elastic body according to the present invention.

FIG. 9d is a cross-sectional view illustrating a case that a measuring block is applied to a limiter with one elastic body according to the present invention. In this case, the limiter 30 includes a first limiter 30a and a second limiter 30b. The bottom of the first limiter 30a is screwed to the lower support 14, and the top of the first limiter 30a is screwed to the second limiter 30b. In addition, the second limiter can be screwed to the top of the first limiter 30a after the upper support 13 is fixed to the measuring block 110 by a coupling member, e.g., a bolt.

A fine gap is formed between the top of the first limiter 30a and the inner lower surface of the first support 214. As the lower support 14 ascends due to the force-insertion force during the force-insertion process, the first support 214 contacting the inner lower surface provides the force-insertion force to the measuring block 110 and thus the measuring block 110 is deformed.

Embodiment 5

Figure 10A:
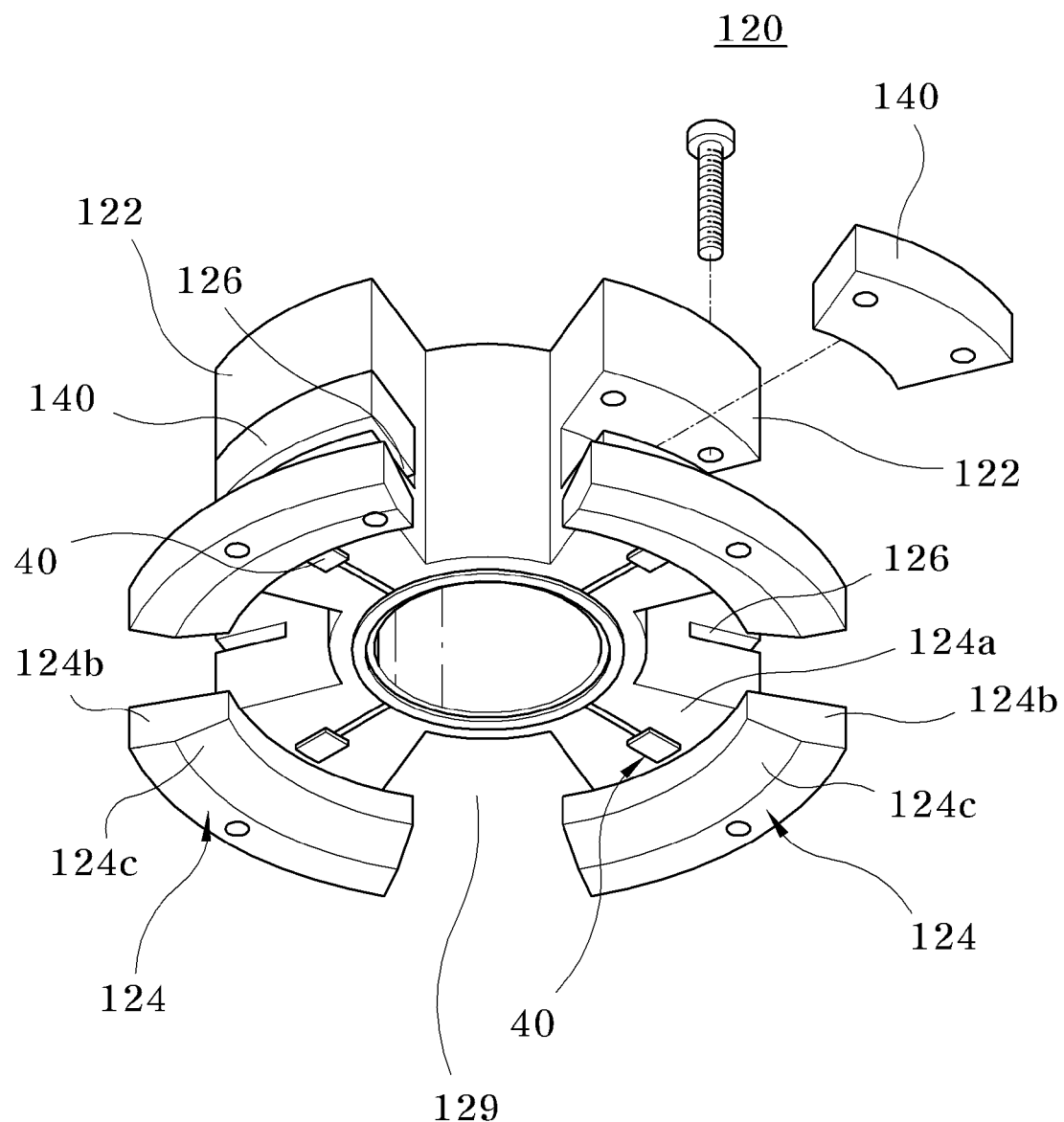
FIG. 10a is a perspective view illustrating a case that the second embodiment of the measuring block is applied to the elastic body according to the present invention.
Figure 10B:
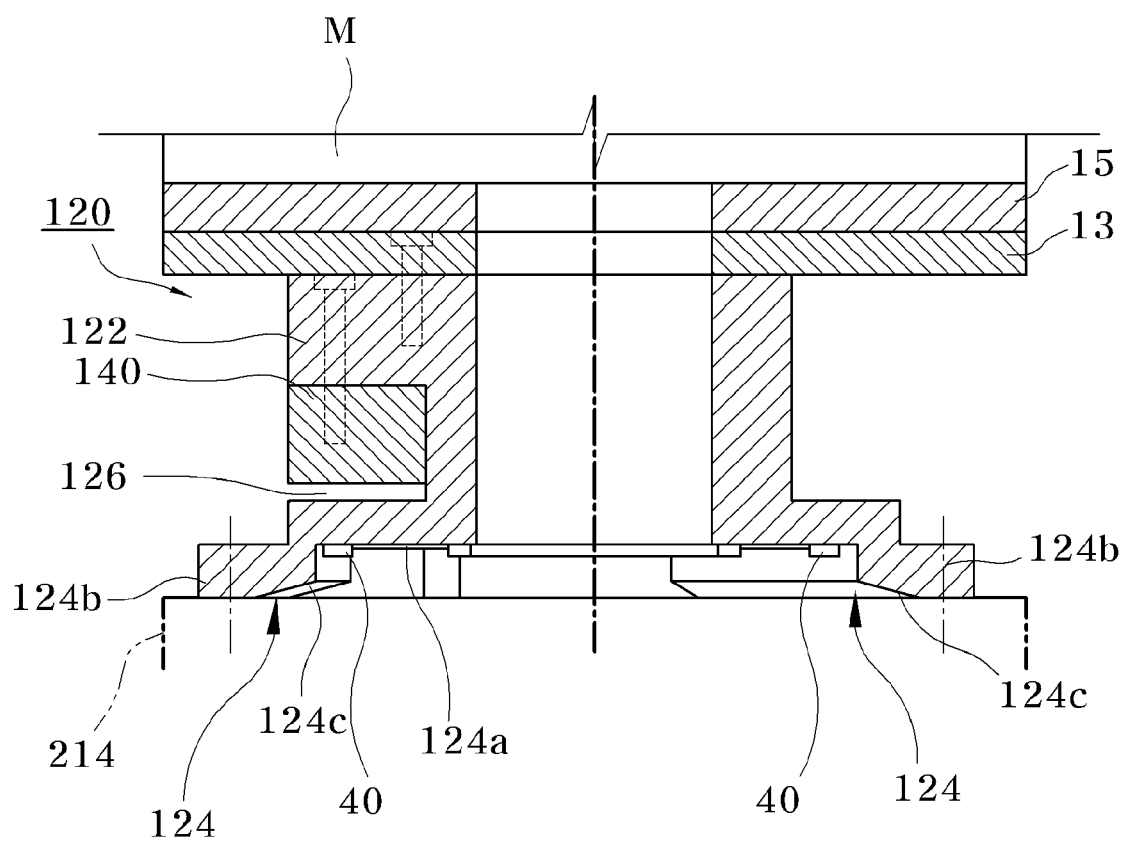
FIG. 10b is a cross-sectional view illustrating a usage state when the second embodiment of the measuring block is applied to the elastic body according to the present invention.
Figure 10C:
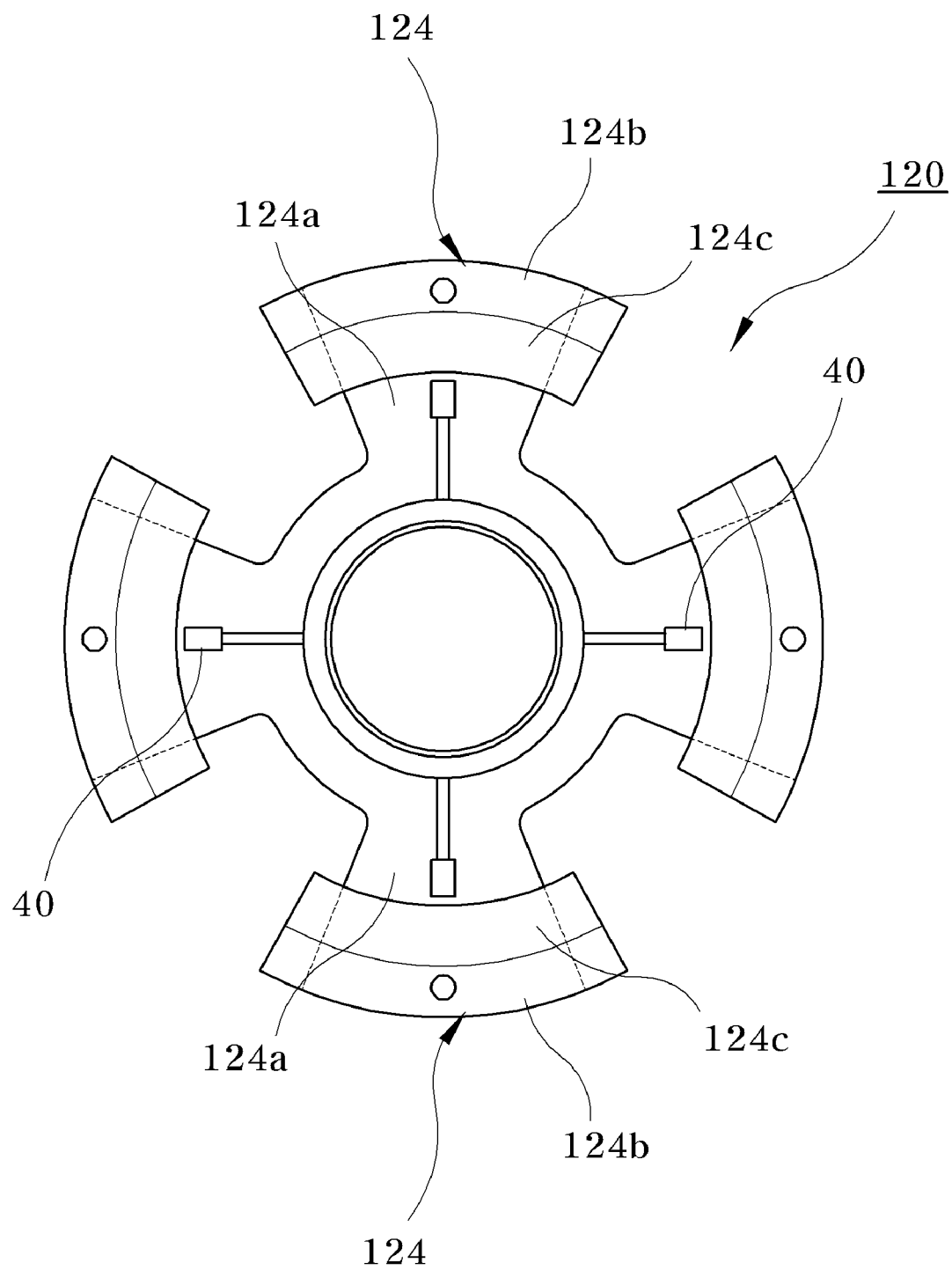
FIG. 10c is an assembled bottom view of a measuring block according to a second embodiment of the present invention.

Second Embodiment of the Measuring Block is Applied to the Remote Center Compliance Device FIG. 10a is a partial exploded perspective view of a measuring block in a remote center compliance device with one elastic body according to a second embodiment of the present invention, and FIG. 10b is a cross-sectional view of the assembled state of FIG. 10a, based on a complex cutting method.

Referring to FIGS. 10a and 10b, the measuring block 120 according to the second embodiment of the present invention includes a fixing portion 122 fixed to the bottom of the upper structure 13, and a measuring portion 124 provided under the fixing portion 122. An allowable deformation gap 126 is defined to maintain the gap between the fixing portion 122 and the measuring portion 124.

In addition, the measuring portion 124 has a recess 124a in the center, and a protrusion 124b in a periphery of the recess 124a. The protrusion 124b is cut into a plurality of unit pieces at regular intervals in the region where the mount spaces 129 are formed.

In addition, a sloped surface 124c is formed in a bottom of the protrusion 124b so as to minimize the contact area with the bottom structure 14. The sloped surface 124c has a slope rising from an outer side to an inner side by a predetermined angle. The sloped surface 124c has the same operational effect as that of the first embodiment.

Meanwhile, the force-insertion force measuring sensor 40 provided in the recess 124a is implemented with an electrical strain gage. A plurality of electrical strain gages arranged in perpendicular to one another are provided in X-axis and Y-axis directions. However, the present invention is not limited to this configuration. The plurality of electrical strain gages can measure the force-insertion force more correctly.

The allowable deformation gap 126 prevents the measuring portion 124 from exceeding the elastic limit and being deformed. Generally, the allowable deformation gap 126 ranges from 0.1 mm to 0.2 mm. However, it is difficult to process the allowable deformation gap 126. To solve this problem, the space is formed by processing a predetermined portion of the allowable deformation gap region.

In addition, the fixing block 140 is placed in the above space, and the allowable deformation gap 126 is formed by the height difference between the fixing block 140 and the processed space.

A measuring method using the measuring block according to a second embodiment of the present invention is identical to that according to the first embodiment of the present invention. A method for measuring the force-insertion force is identical to that according to the first embodiment of the present invention. Therefore, their detailed description will be omitted.

Embodiment 6

Figure 11A:
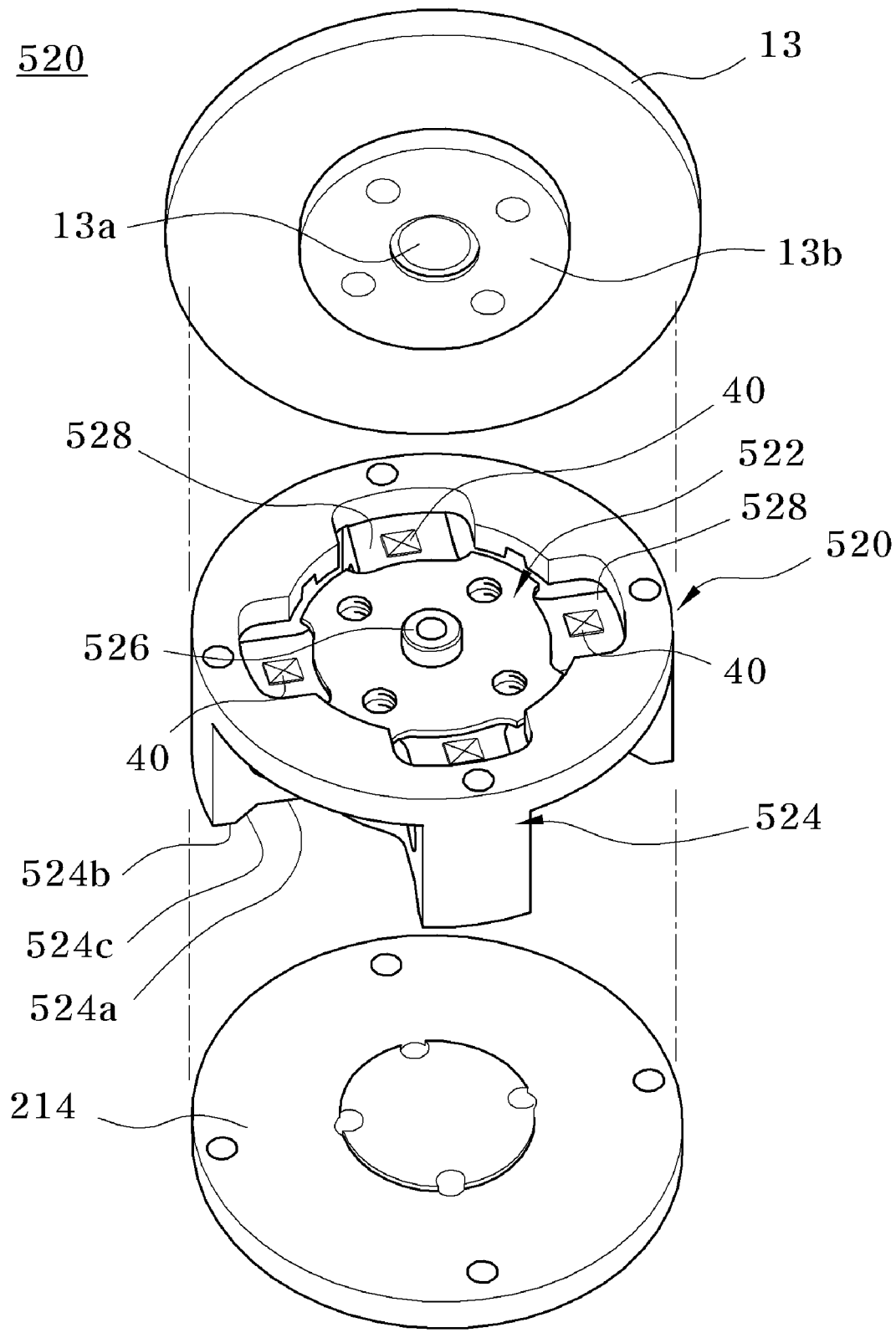
FIG. 11a is a partial exploded perspective view of a measuring block according to a third embodiment of the present invention.
Figure 11B:
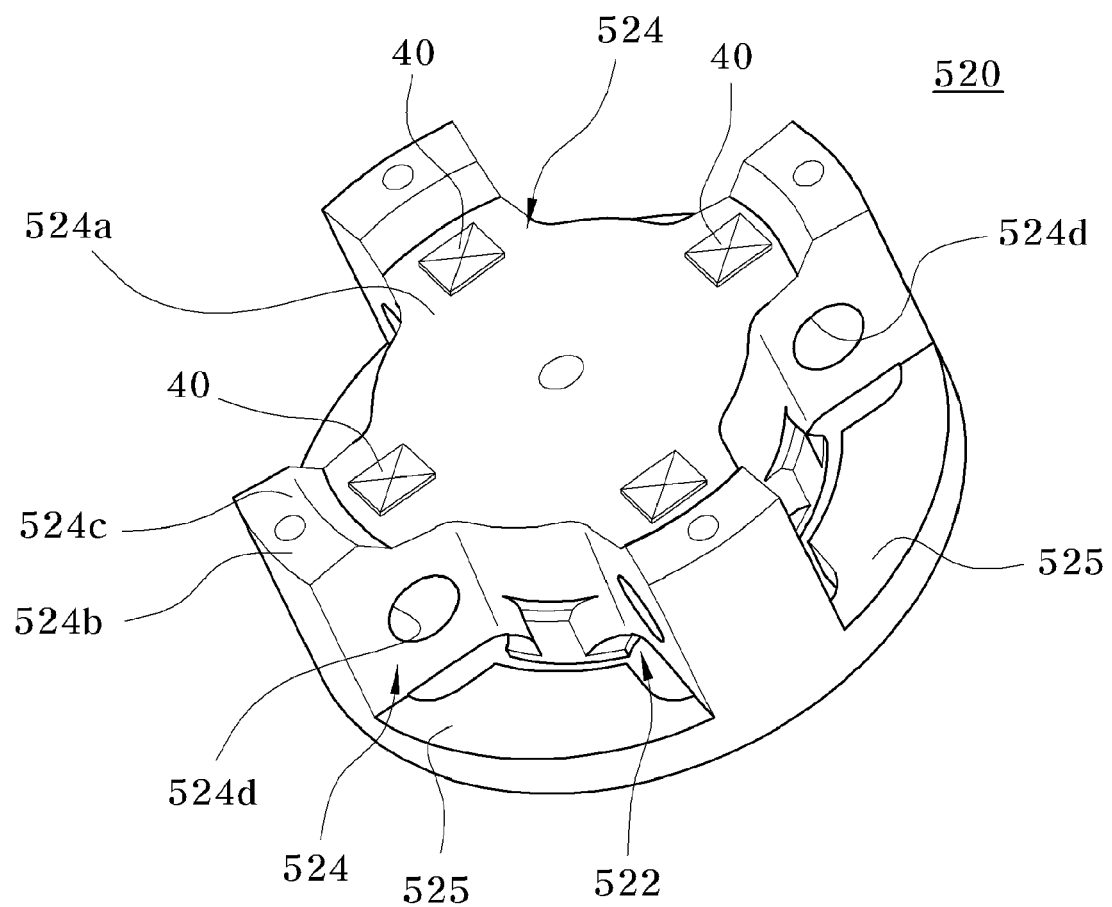
FIG. 11b is a bottom perspective view of the measuring block according to the third embodiment of the present invention.
Figure 11C:
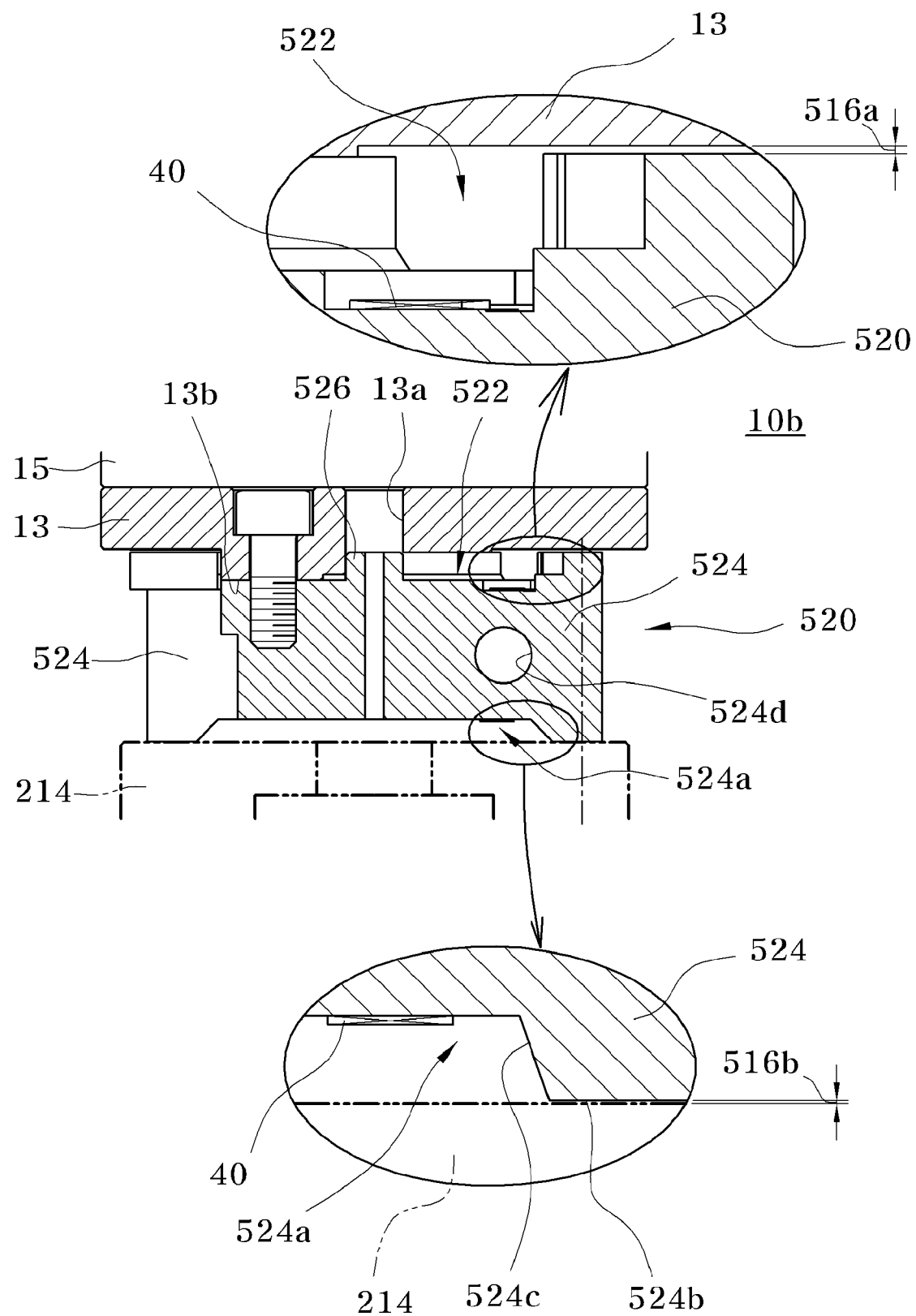
FIG. 11c is a cross-sectional view of the measuring block of FIG. 11a, based on a complex cutting method.

Third Embodiment of the Measuring Block is Applied to the Remote Center Compliance Device FIG. 11a is a partial exploded perspective view of a measuring block according to a third embodiment of the present invention, FIG. 11b is bottom perspective view of the measuring block according to the third embodiment of the present invention, and FIG. 11c is a cross-sectional view illustrating the assembled state of FIG. 11a.

Referring to FIGS. 11a and 11b, the measuring block 520 includes a fixing portion 522 and a cross-shaped measuring portion 524. The fixing portion 522 is fixed to the protruding bottom surface 13b of the upper structure 13. The measuring portion 524 is provided under the fixing portion 522.

The fixing portion 522 is recessed in a cross shape to a predetermined depth. A coupling protrusion 526 protrudes from the center of the fixing portion 522. The fixing portion 522 is tightly connected to the bottom surface 13b of the upper structure 13 having a coupling hole 13a in the center. A recessed surface 528 is formed in the fixing portion 522 in the direction of the measuring portion 524. A measuring sensor 40 is attached to the recessed surface 528 to measure the bending deformation amount of the measuring portion 524.

The measuring portion 524 forming the cross shape is formed under the fixing portion 522. At least one force-insertion force measuring sensor 40 is provided in the recess 524a. A protrusion 524b is formed around the periphery of the recess 524a. A connecting portion 525 connects the cross-shaped measuring portions 524, and a mount space 529 is formed at one side of the connecting portion 525.

In addition, the cross-shaped measuring portion 524 has a penetration hole 524d in the center to adjust the bending deformation amount of the measuring portion 524.

As illustrated in FIG. 11, the measuring portion 524 and the fixing portion 522 have a plurality of coupling holes and a plurality of screw holes, so that the upper structure 13, the measuring block 520, and the bottom structure 14 are mutually connected by the fixing member. In this way, the remote center compliance device 10a is configured to measure the force-insertion force using the measuring block 520.

In addition, the coupling protrusion 526 of the fixing portion 522 is connected to the coupling hole 13a of the upper structure 13, and the upper structure 13 and the fixing portion 522 are fixed by a fixing member.

Preferably, the measuring portion 524 and the lower structure 14 are connected by the limiter 30.

As the protrusion bottom surface of the upper structure 13 and the fixing portion 522 are fixed together, a fine allowable deformation gap 516a occurs between the outer upper surface of the fixing portion 522 and the upper structure 13, and a fine allowable deformation gap 516b occurs between the lower structure 14 and the protrusion 524b of the measuring portion 524. Therefore, the lower structure 14 can smoothly correct the location error.

The allowable deformation gap 516a prevents the measuring portion 54 from exceeding the elastic limit and being deformed. Generally, the allowable deformation gap 516a ranges from 0.1 mm to 0.2 mm.

The operation and effect of the measuring block according to the third embodiment of the present invention will be described below with reference to FIG. 11.

Detailed description of the force-insertion process having already described in the first and second embodiments of the present invention will be omitted.

In the measuring block provided between the upper structure 13 and the lower structure 14, the protrusion 524b and the sloped surface 524c provided in a lower portion of the measuring portion 524 are deformed by the force-insertion force acting between the upper structure 13 and the lower structure 14. The force-insertion force measuring sensor 40 provided in the recess 524a of the measuring portion 524 measures the bending deformation amount of the recess 524a. Since this is identical to the operation of the measuring sensor 40 according to the first and second embodiments of the present invention, its detailed description will be omitted.

The fixing portion 522 is fixed to the bottom protrusion 13b of the upper structure 13, and the central coupling protrusion 526 is fixed to the coupling hole 13a by a fixing member (not shown). The measuring sensor 40 is provided in the recessed surface 528 of the fixing portion 522. Due to the bending of the measuring portion 524, the recessed surface 528 formed on the upper surface of the measuring portion 524 is deformed. The measuring sensor 40 provided in the recessed surface 528 measures the deformation. Since this is identical to the operation of the measuring sensor 40 according to the first and second embodiments of the present invention, its detailed description will be omitted.

The buffering operation and deformation of the measuring block 520 are easily performed by the penetration hole 524d provided in the center of the cross-shaped measuring portion 524. Therefore, the force-insertion force is more correctly measured.

When the force-insertion force is generated by the force-insertion process, the initial force-insertion force can be measured by the fixing portion 522 contacting the upper and lower structures 13 and 14 and the recessed portion 524a of the cross-shaped measuring portion 524. Therefore, the force-insertion force can be precisely measured.

Preferably, the measuring senor may be selectively provided in the fixing portion and/or the cross-shaped measuring portion according to the user's convenience.

Embodiment 7

Figure 12A:
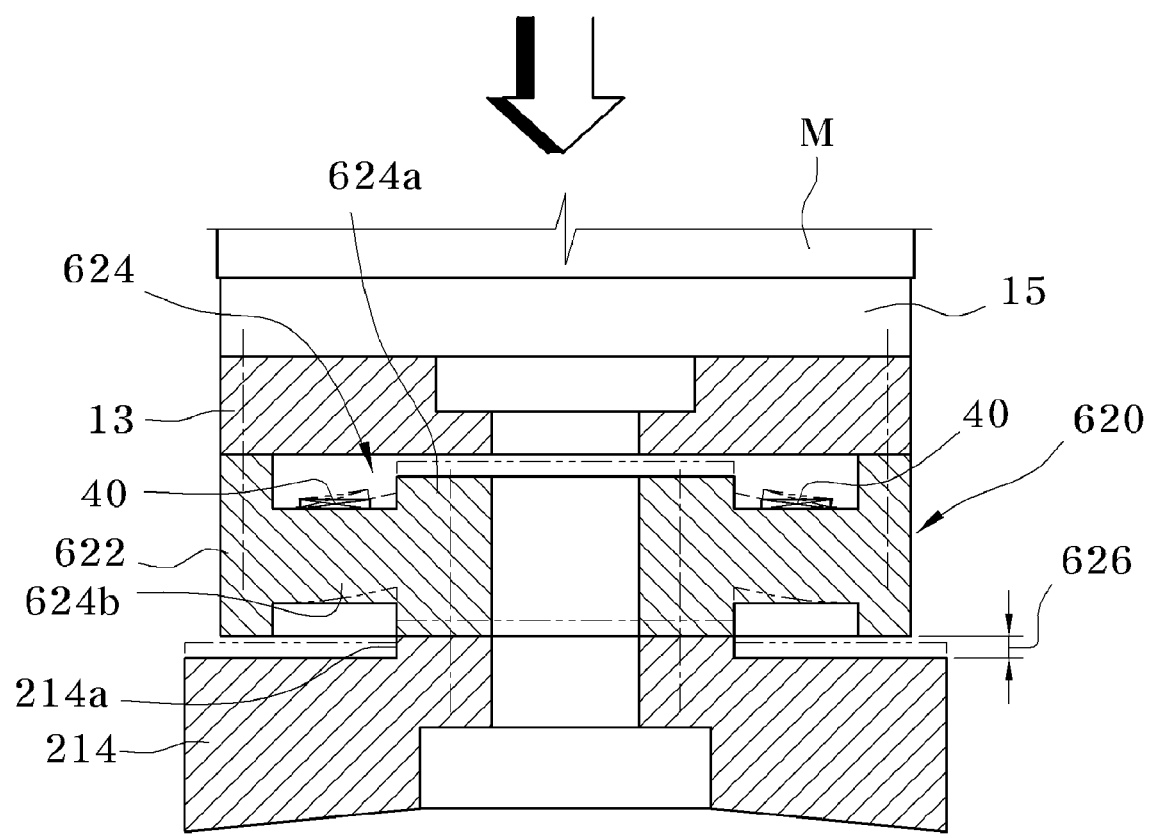
FIG. 12a is a cross-sectional view illustrating a usage state of a measuring block according to a fourth embodiment of the present invention.
Figure 12B:
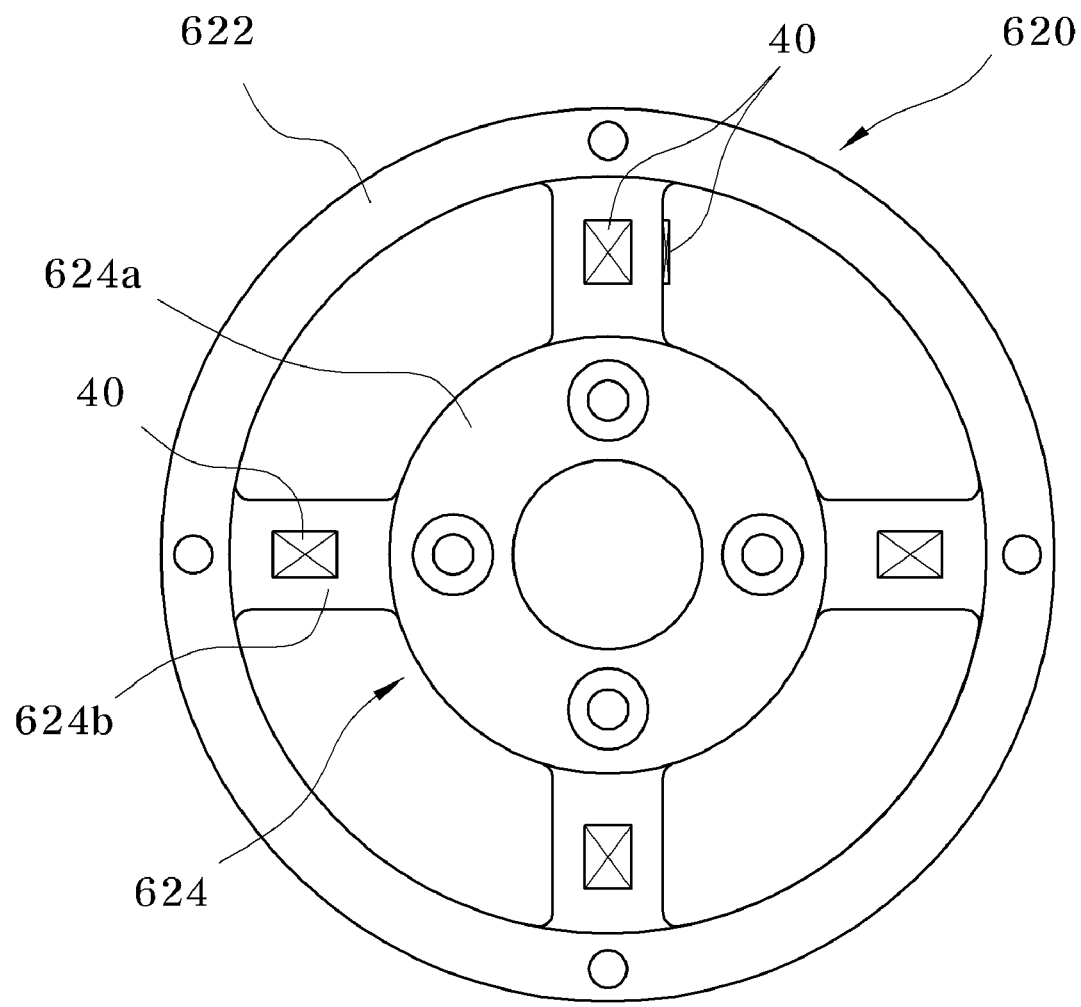
FIG. 12b is a plan view of the measuring block according to the fourth embodiment of the present invention.

Fourth Embodiment of the Measuring Block is Applied to the Remote Center Compliance Device FIG. 12a is a cross-sectional view illustrating a usage state of a measuring block according to a fourth embodiment of the present invention, and FIG. 12b is a plan view of the measuring block according to the fourth embodiment of the present invention.

Referring to FIGS. 12a and 12b, the measuring block 620 according to the fourth embodiment of the present invention includes a fixing portion 622 fixed to the bottom of the upper cover 15, and a measuring portion 624 provided at an inside of the fixing portion 622.

The fixing portion 622 has a cylindrical shape and is coupled to the bottom of the upper support 13 by a coupling member (not shown), e.g., a bolt. The measuring portion 624 includes a cylindrical measuring member 624a spaced apart from the upper cover 15 by a predetermined distance. The measuring member 624a and the fixing portion 622 are integrated by at least three coupling member 624b.

In addition, the first support 214 fixed to the bottom of the measuring block 620 includes a protrusion 214a and is coupled to the bottom of the measuring member 624a of the measuring portion 624 by a coupling member (not shown), e.g., a bolt. As the measuring member 624a of the measuring block 624 is coupled to the protrusion 214a, the allowable deformation gap 626 is formed between the bottom of the measuring member 624a and the top of the first support 214.

Further, the measuring sensor 40 is attached to either or both of the top and bottom of the coupling member 624b.

The operation of the measuring block according to the fourth embodiment of the present invention will be described below with reference to FIGS. 12a and 12b.

The same force-insertion process described in the first and second embodiments of the present invention will be omitted.

Referring to FIG. 12a, as the first support 214 moves upward by the force-insertion force acting on the remote center compliance device during the force-insertion process, the protrusion 214a of the first support 214 and the measuring member 624a fixed thereto move upward. Due to the upward movement of the measuring member 624a, a portion of the coupling member 624b integrated between the measuring member 624a and the fixing member 622 moves along the measuring member 624a, causing the coupling member 624b to be bent. Due to the bending of the coupling member 624b, the measuring sensor 40 attached to one surface of the coupling member 624b measures the deformation amount of the coupling member 624b. Since this operation is identical to that of the measuring sensor 40 according to the first and second embodiments of the present invention, its detailed description will be omitted.

Furthermore, the fixing portion 622 is coupled to the upper structure 13 by a coupling member such as a bolt. Only the measuring member 624a of the measuring portion 624 moves along the upward/downward movement of the first support 214. Thus, the coupling member 624b coupling the fixing member 622 and the measuring member 624b is bent.

When the measuring portion 624 measures the force-insertion force, the gap between the bottom of the upper support 13 and the measuring member 624a may be identical to the allowable deformation gap 626 formed between the first support 214 and the fixing portion 622.

In addition, the force-insertion force acting on the remote center compliance device during the measurement of the force-insertion force is directly applied to the measuring member by the first support and thus it can be measured starting from its initial force. Hence, the force-insertion force can be measured finely and precisely.

Embodiment 8

Figure 13:
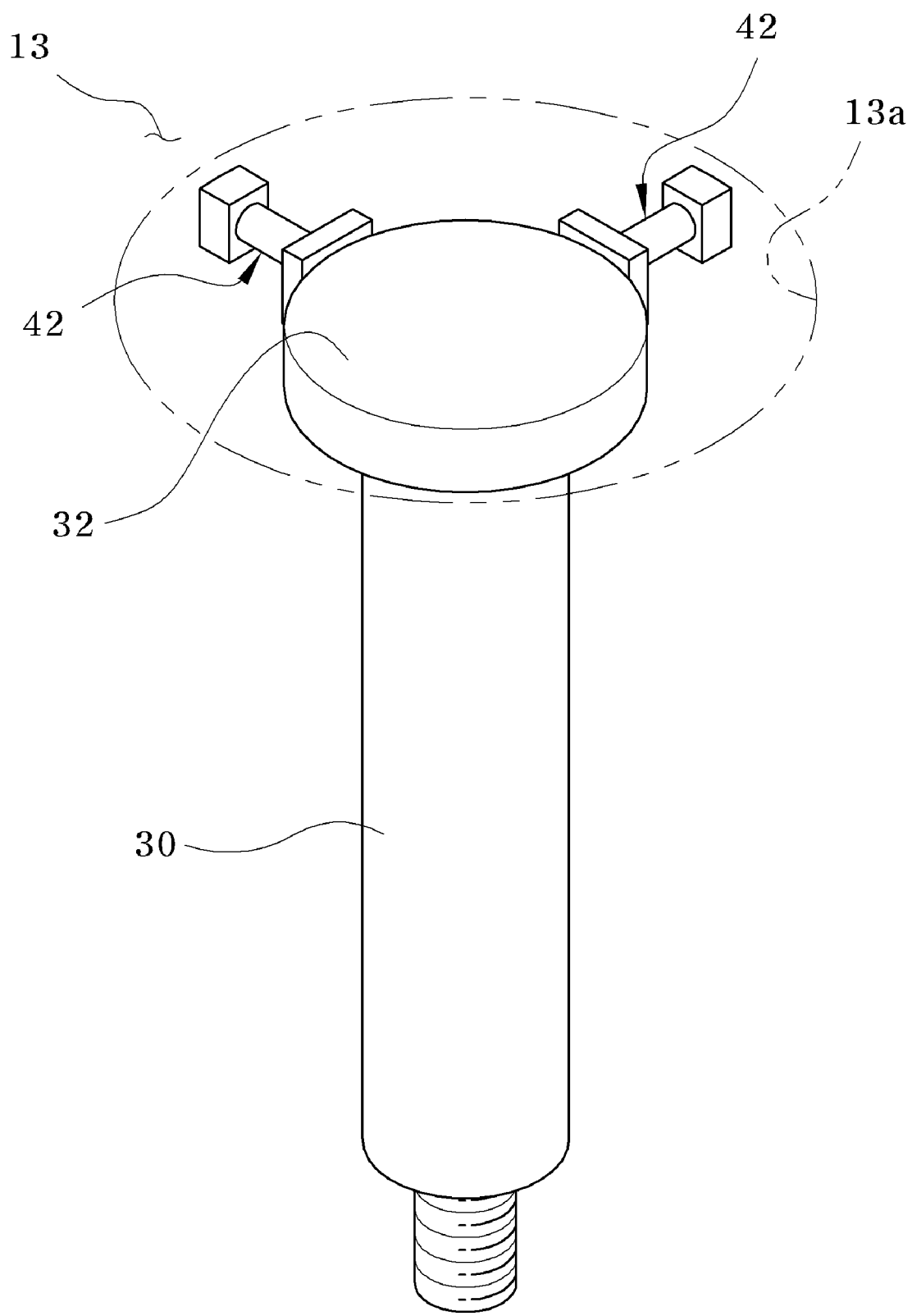
FIG. 13 is a perspective view of a location displacement measuring unit according to a first embodiment of the present invention.

First Embodiment of the Displacement Measuring Unit is Applied to the Remote Center Compliance Device FIG. 13 is a perspective view of a location displacement measuring unit according to a first embodiment of the present invention. Referring to FIG. 13, displacement sensors 42 measuring a horizontal displacement at an upper portion of the limiter are arranged perpendicular to each other. The displacement sensors 42 measure a correction amount of a location error in real time during the force insertion, and outputs the measured correction amount on an external display device. In addition, it is apparent that the location displacement measuring unit of FIG. 8 can be applied to any remote center compliance device using the limiter 30, as well as a remote center compliance device receiving a measuring block and a remote center compliance device applying one elastic body.

Embodiment 9

Second Embodiment of the Displacement Measuring Unit is Applied to the Remote Center Compliance Device

Figure 14A:
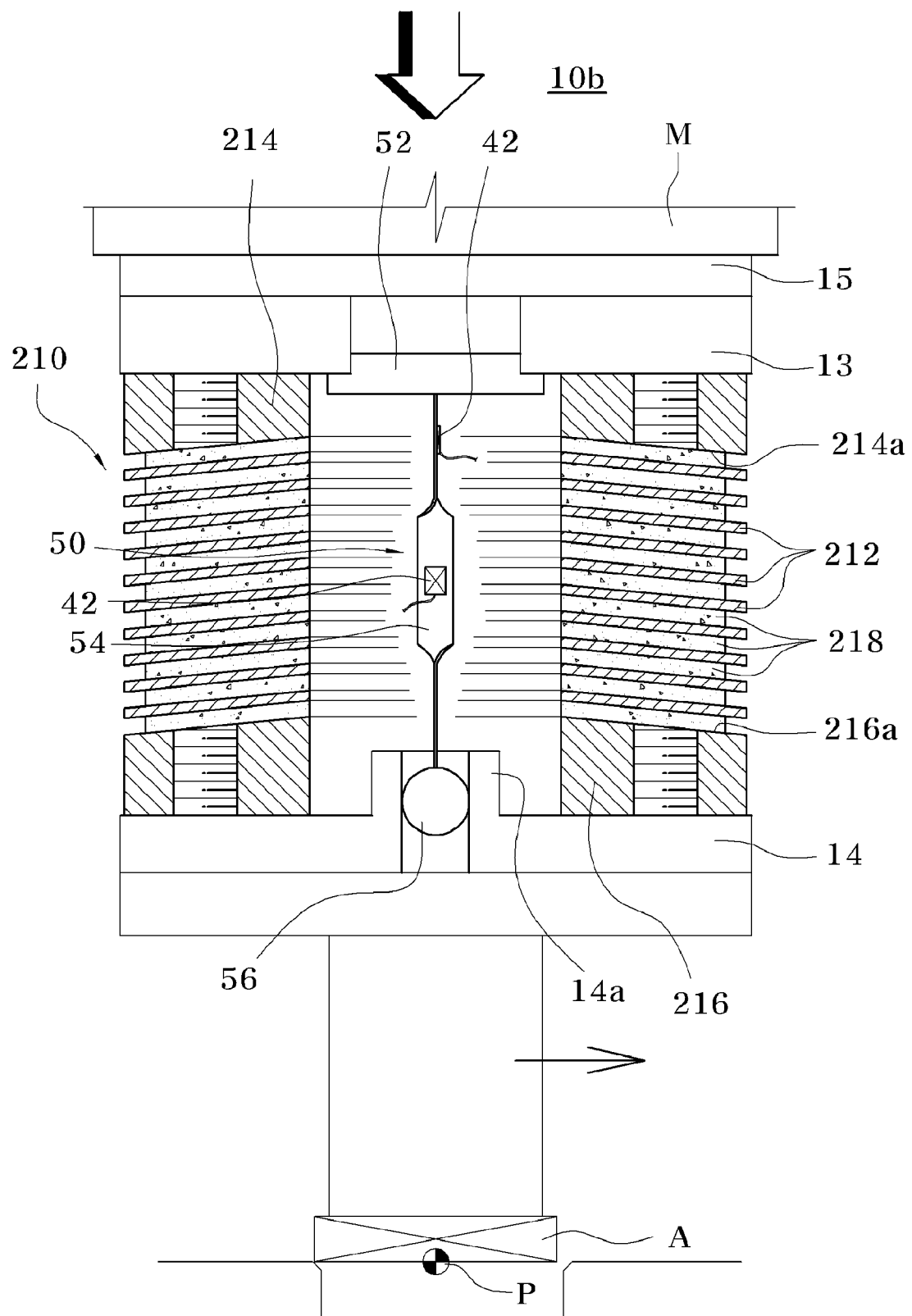
FIGS. 14a and 14b are a cross-sectional view showing an assembled state of a location displacement measuring unit according to a second embodiment of the present invention.
Figure 14B:
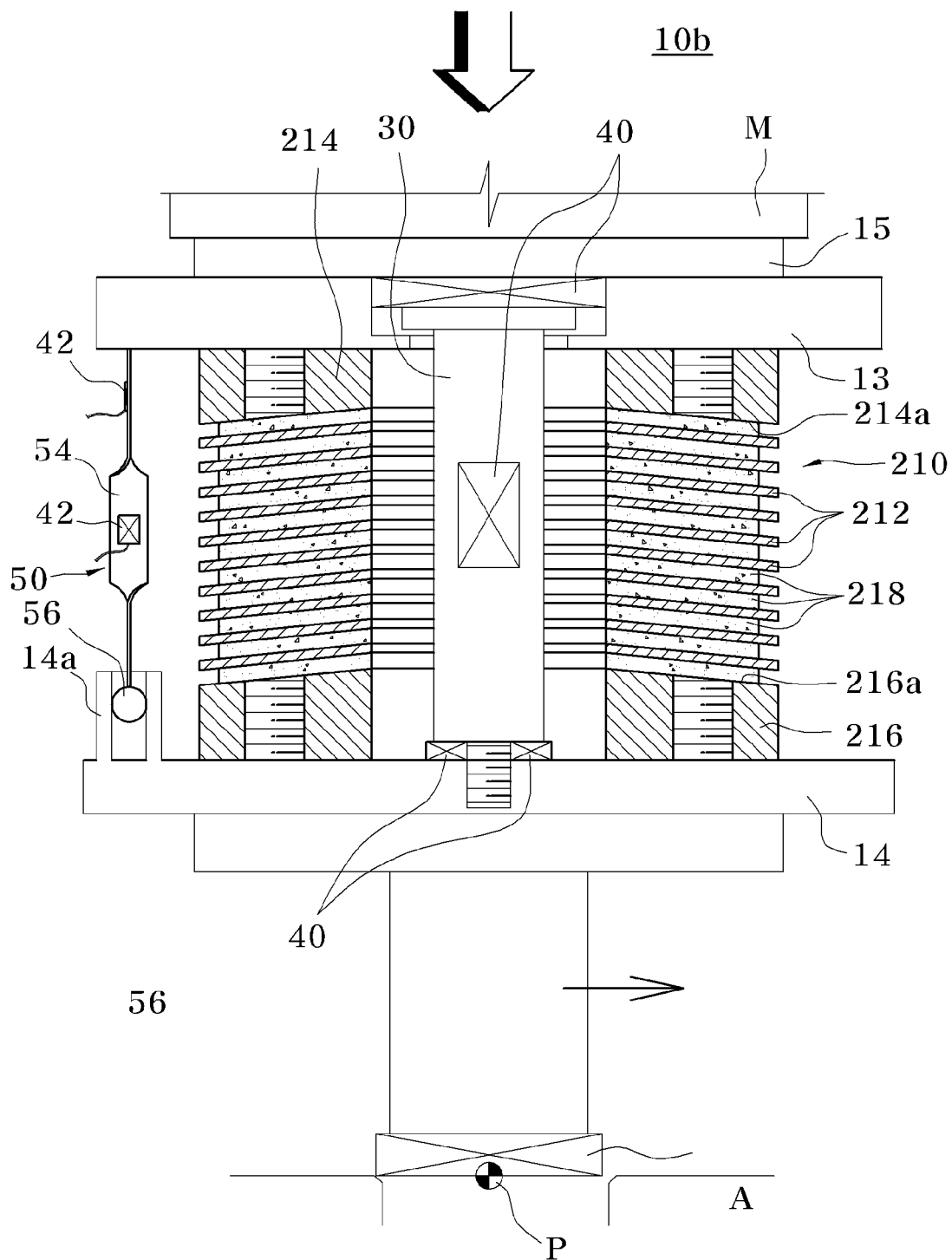

FIG. 14a is a cross-sectional view showing the location displacement measuring unit disposed between the upper structure 13 and the lower structure 14, and FIG. 14b shows further the limiter (30).

Referring to FIGS. 14a and 14b, when the error correction is performed on the lower structure 14 so as to match the centers of the boss and the force-insertion part, a location of a ball probe holder 14a fixed to the lower structure 14 moves horizontally by a predetermined corrected amount. Therefore, an elastic plate 54 fixed vertically to a displacement sensor bracket 52 fixed to the lower portion of the upper structure 13 is bent in a correcting direction by the ball probe 56 inserted into the ball probe holder 14a. The displacement sensors 42 are attached to on surfaces twisted in a perpendicular direction in the elastic plate. The displacement sensors 42 calculate the location displacement values of the remote center compliance device.

The force-insertion force measuring sensor 40 attached to the limiter 30 calculates the force-insertion force according to an amount of the compressive deformation, and the displacement sensor 42 calculates the location displacement values. The calculated force-insertion force and location displacement values are outputted to the external display device (not shown).

Figure 15A:
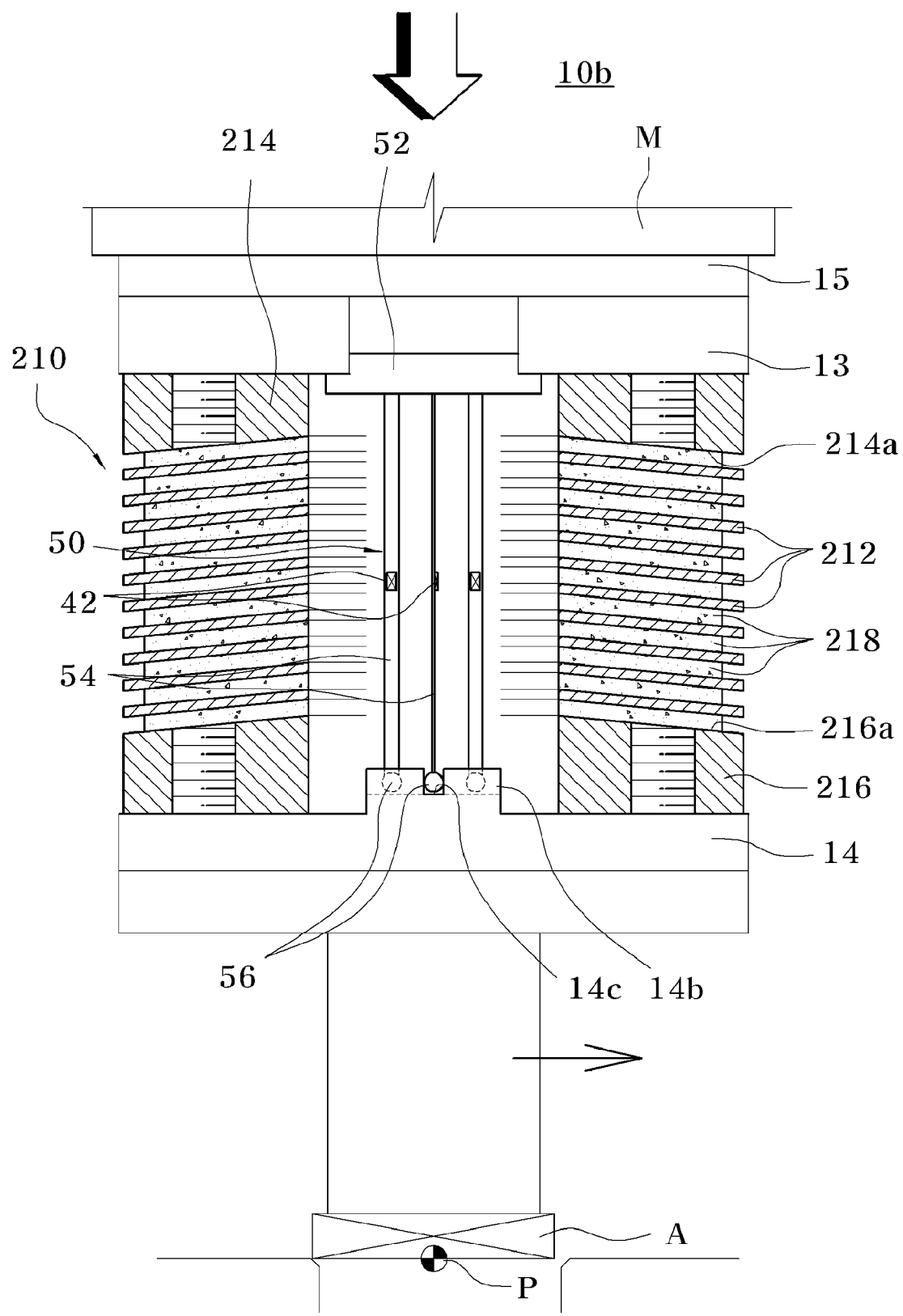
FIGS. 15a and 15b are a cross-sectional view showing an assembled state of a location displacement measuring unit according to a third embodiment of the present invention.
Figure 15B:
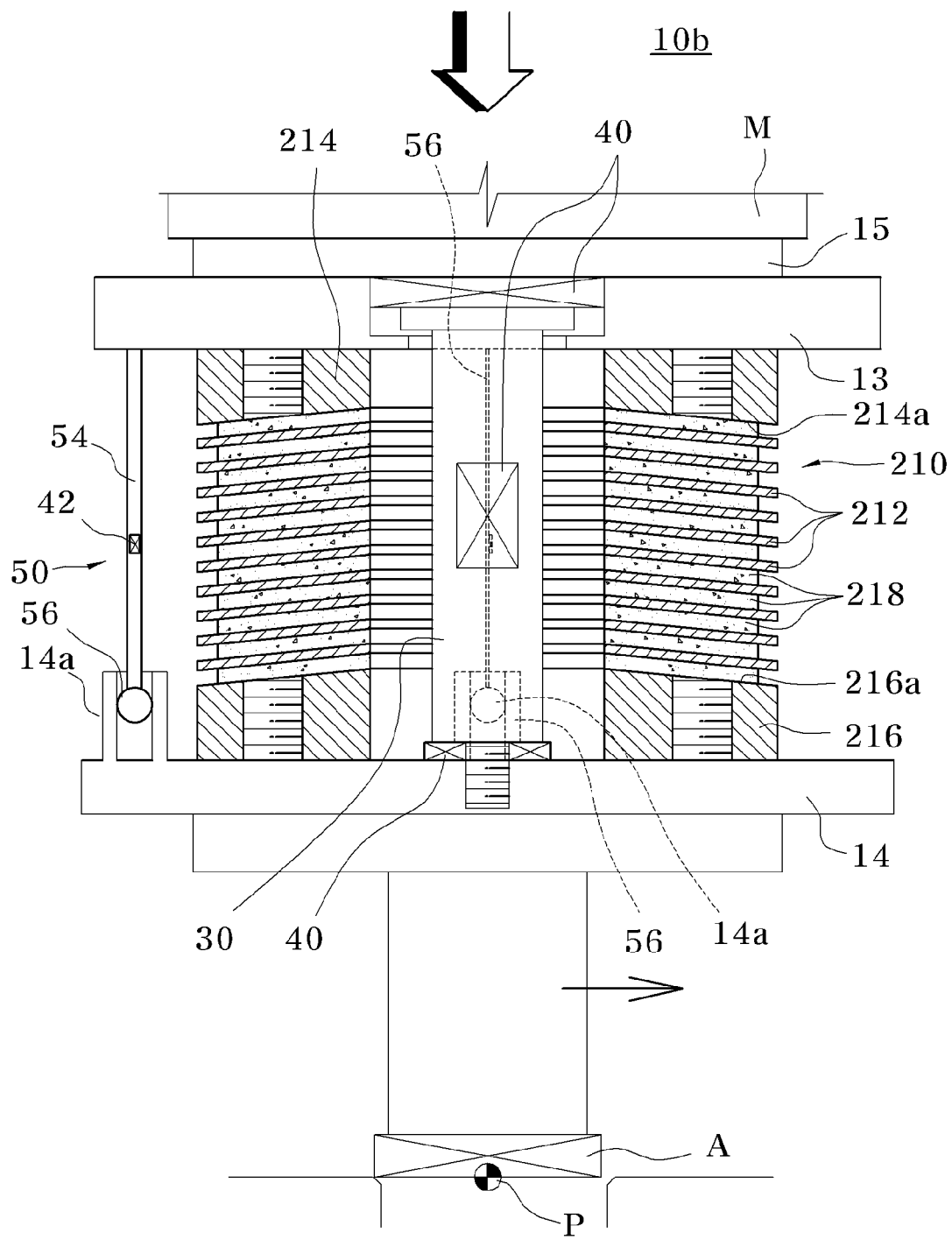
Figure 15C:
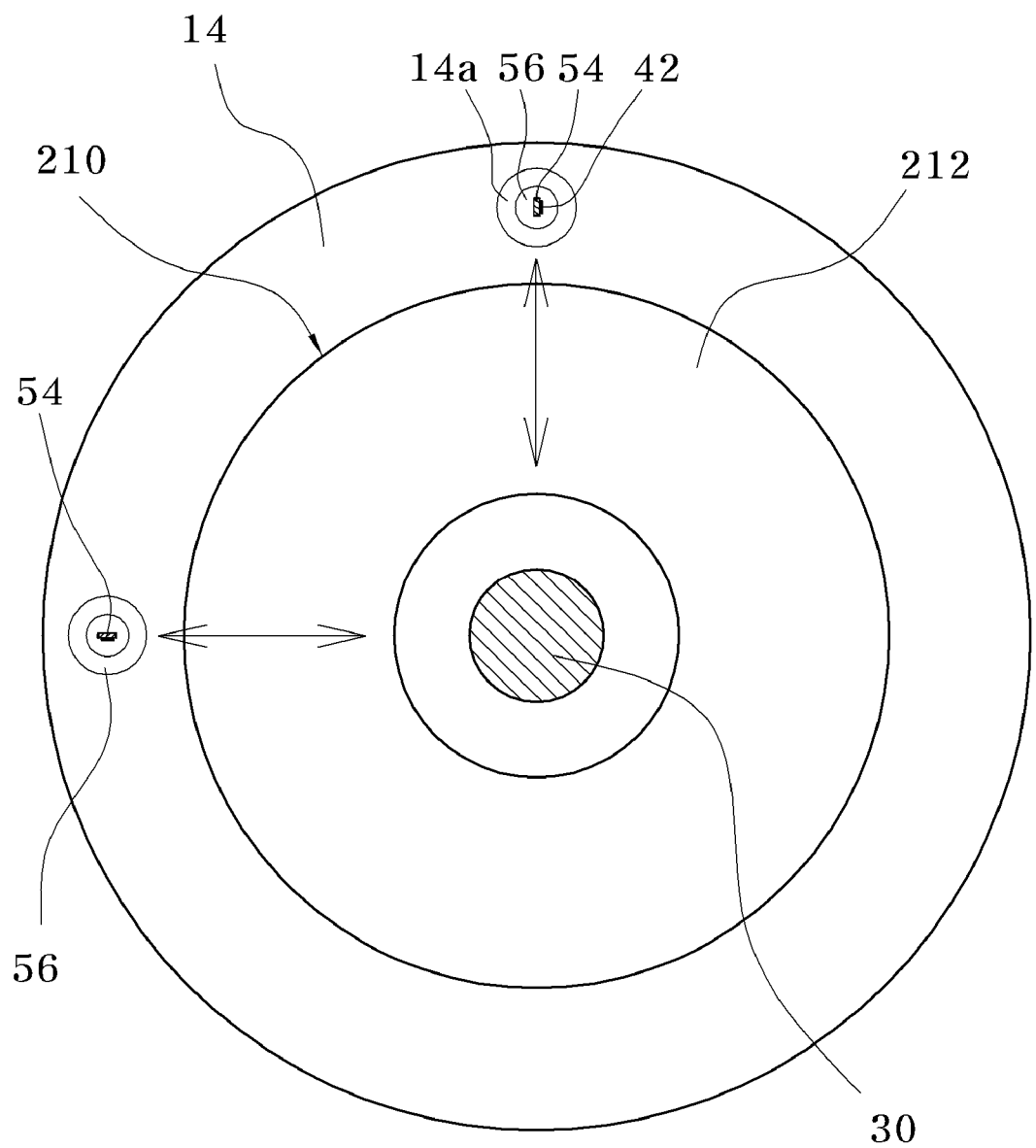
FIG. 15c is a cross-sectional view showing a usage state of the location displacement measuring unit of FIGS. 15a and 15b.

FIGS. 15a and 15b are a cross-sectional view showing an assembled state of a location displacement measuring unit according to a third embodiment of the present invention, and FIG. 15c is a cross-sectional view illustrating a usage state of FIGS. 15a and 15b.

In the location displacement measuring unit of FIGS. 15a and 15b, when the lower structure 14 for matching the centers of the boss and the part moves for the error correction, the location of the ball probe holder 14b fixed to the lower structure 14 and having a cross groove at an upper portion moves horizontally by a predetermined correction amount. Therefore, at least one elastic plate 54a is bent in the correcting direction by the ball probe 56 inserted into the ball probe holder. The elastic plate 54a is fixed to the displacement sensor bracket 52 fixed to a lower portion of the upper structure and is provided in X-axis and/or Y-axis directions to correspond to the cross groove 14c of the ball probe holder 14b. Since the displacement sensors are attached to the elastic plate bent in the correcting direction, the location displacement values of the remote center compliance device 10 can be calculated.

Figure 16:
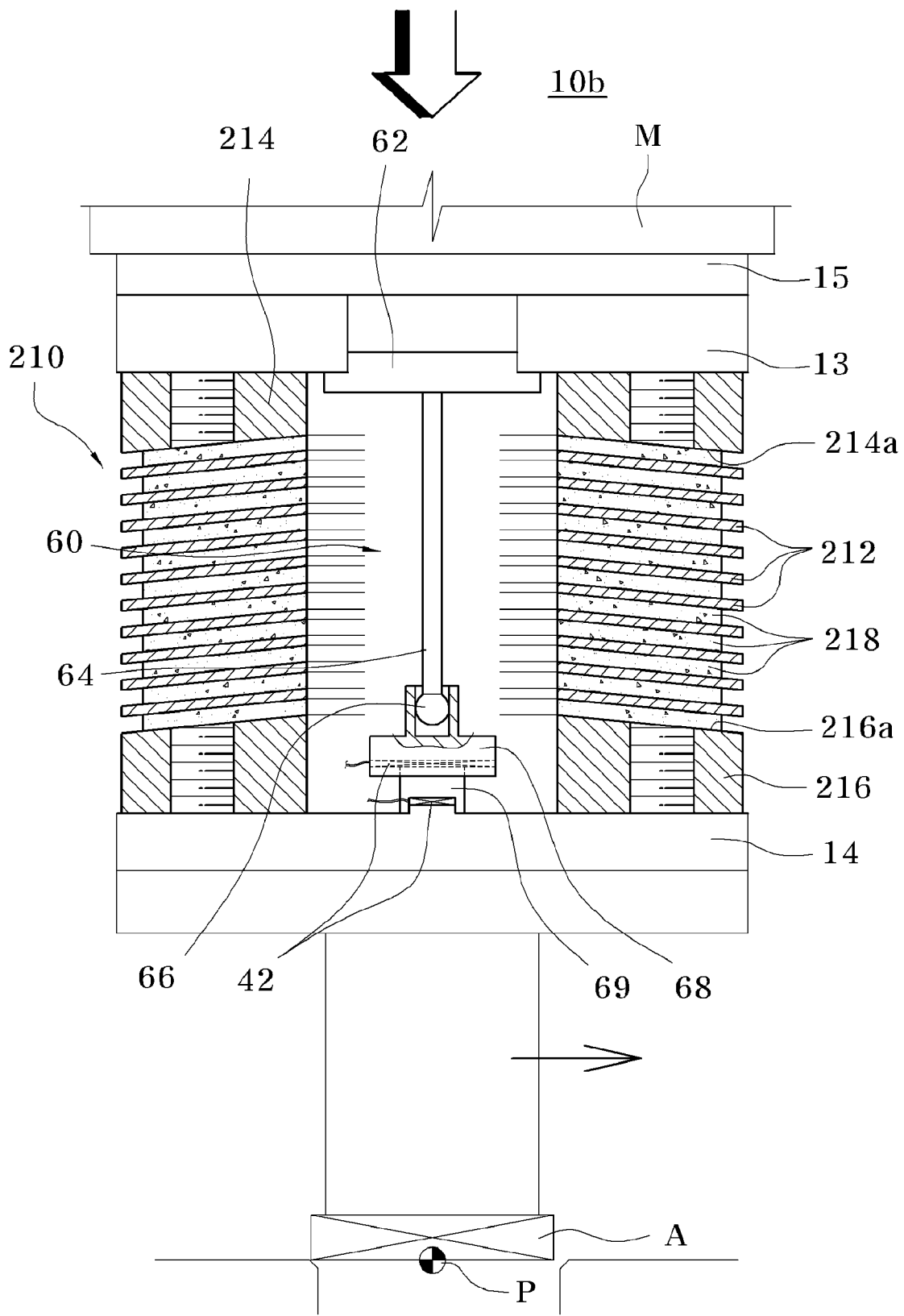
FIG. 16 is a cross-sectional view showing an assembled state of a location displacement measuring unit according to a fourth embodiment of the present invention.

FIG. 16 is a cross-sectional view of a structure that measures a correction amount of the lower structure 14 when the lower structure 14 is error-corrected so as to match the centers of the boss and the part. A ball probe 66 fixed to a lower portion of the upper structure 13 is inserted into a ball probe pocket provided above a slide-type displacement sensor 69 fixed to an upper portion of the lower structure 14. Therefore, the correction amount and direction of the lower structure 14 can be measured.

An electrical strain gage is suitable for the displacement sensor 42 illustrated in FIGS. 14a, 14b, 15a and 15b, and a linear displacement sensor such as a potentiometer, a linear scale, an LVDT is suitable for the slide-type displacement sensor illustrated in FIG. 16.

According to the remote center compliance device of the present invention, the structure is so simple that its manufacturing process and cost are reduced. The center error between the boss and the part can be corrected, and the location displacement caused by the force-insertion force and error correction can be measured. Further, the remote center compliance device can be applied to the existing products.

As described above, because the remote center compliance device includes one elastic body, the number of parts is minimized. Therefore, the cumulative error caused by the manufacture error and the assembly error can be minimized and thus the elastic center P can be easily adjusted.

These effects are identical to the radial installation of a plurality of elastic bodies of the remote center compliance device disclosed in Korean Patent Laid-open Publication No. 2001-85013. The elastic center that has been generated by at least three elastic bodies can be simply and correctly generated by one elastic body. Meanwhile, the remote center compliance device with a plurality of elastic bodies has a problem in that the elastic center is changed according to the direction with respect to the external force acting in a direction between the elastic bodies. However, according to the present invention, the effect of the more correct and constant elastic center can be used because one elastic body has no direction.

Furthermore, since the remote center compliance device is implemented with a minimum number of parts, the manufacturing cost and process are reduced and the maintenance is easy, thereby improving the product competitiveness.

Moreover, the measuring sensor for measuring the force-insertion force of the force-insertion apparatus is provided at the limiter or the measuring block, or the measuring sensor for measuring the location displacement is provided. Hence, the force-insertion force or the location displacement can be measured.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A remote center compliance device for correcting a center error between a boss and a force-insertion part through a translation based on an elastic center principle, the remote center compliance device comprising:
   upper and lower structures (13, 14);
   a plurality of disks (212) having a predetermined slope;
   first and second supports (214, 216) stacked at predetermined distance and disposed on both ends of the disks (212), the first and second supports (214, 216) including a protrusion (216a) and a recess (214a) having the same slope and a plurality of coupling holes; and
   an elastic body (210) including a filler (218) for elastically connecting the disks (212) stacked between the first and second supports (214, 216), the elastic body (210) being fixed to the upper and lower structures (13, 14) through the coupling holes.

2. The remote center compliance device of claim 1, wherein the disk (212) has the slope (θ) inclined from an inner side to an outer side.

3. The remote center compliance device of claim 1, further comprising:
   upper and lower structures (310, 320) disposed in the first and second supports (214, 216) of the elastic body (210) and connected together by a coupling member; and
   a limiter (30) disposed between the upper and lower structures (310, 320), the limiter (30) including a screw part (336) fixed to one of the upper and lower structures (310, 320), and a head part (332) for spacing the other of the upper and lower structures (310, 320) by a predetermined distance, such that the elastic body (210) is prevented from buckling and damage due to a tensile force and a force-insertion force caused by weight of the limiter 30.

4. The remote center compliance device of claim 3, wherein the upper structure (310) includes a plurality of coupling holes at the upper portion (312), a flange (314) extending downward, and a receiving space (316) defined by an inner side of the flange (314), the receiving space (316) receiving the elastic body (210) and being connected to the first support (214) of the elastic body (210), such that the elastic body (210) is not interfered during a translation movement.

5. The remote center compliance device of claim 3, wherein the lower structure (320) is coupled to the second support (216) of the elastic body (210) and disposed in the receiving space (316) of the flange (314), such that the lower structure (320) is spaced apart from the inner wall of the flange (314) in order for the elastic body (210) not to contact the inner wall of the flange (314) during the translation movement of the elastic body (210).

6. The remote center compliance device of claim 3, further comprising a plurality of wrench grooves (338) formed at the head part (332) of the limiter (30) and into which a wrench is inserted to transfer a coupling force to make an easy connection of the screw (336) to one of the upper and lower structures (310, 320).

7. The remote center compliance device of claim 3, wherein the upper structure (310) includes protrusions (314a) at a lower portion, the protrusions (314a) having an insertion space recessed upward from an end portion.

8. The remote center compliance device of claim 3, wherein the lower structure (320) includes a lower portion (322), a protrusion (324) producing from the lower portion (322) to a predetermined height, a coupling hole (326) defined in the center of the protrusion (324), and a plurality of rotation preventing members (328) inserted into the insertion space of the protrusion (314a) at a periphery of the lower portion (322).

9. The remote center compliance device of claim 3, wherein the limiter (30) further includes a force-insertion force measuring sensor (40).

10. The remote center compliance device of claim 9, wherein the force-insertion force measuring sensor is inserted into and fixed to a side of the limiter (30) or an upper or lower portion of the limiter (30).

11. The remote center compliance device of claim 9, wherein the measuring block includes:
a fixing portion (112) fixed to the upper structure (13); and
a measuring portion (114) disposed under the fixing portion (112) and fixed to a location close to the lower structure (14), with being spaced apart to a predetermined height by an allowable deformation gap (116), the measuring portion (114) providing the force-insertion force measuring sensor (40).

12. The remote center compliance device of claim 9, wherein the force-insertion force measuring sensor includes one of an electrical strain gage and a piezo-electric element.

13. The remote center compliance device of claim 3, further comprising a displacement sensor provided at one of the upper and lower structures (13, 14) to measure a displacement of the limiters.

14. The remote center compliance device of claim 1, further comprising a location displacement measuring unit disposed between the upper and lower structures (13, 14) to measure a relative location displacement between the upper and lower structures (13, 14).

15. The remote center compliance device of claim 14, wherein the location displacement measuring unit includes a measuring sensor for measuring a correction amount using an elastic plate.

16. The remote center compliance device of claim 14, wherein the location displacement measuring unit includes a plurality of slide-type displacement measuring sensors arranged in perpendicular to one another.

17. The remote center compliance device of claim 14, wherein the location displacement measuring unit includes one of a potentiometer, a linear scale, and an LVDT.

18. The remote center compliance device of claim 1, further comprising a measuring block including a force-insertion force measuring sensor at one side of the upper structure 13 and the first support 14.

19. The remote center compliance device of claim 18, wherein the measuring block (520) includes:
a fixing portion (522) fixed to the bottom of the upper structure (13); and
a cross-shaped measuring portion (524) disposed under the fixing portion (522).

20. The remote center compliance device of claim 19, wherein the fixing portion (522) includes a protrusion (526) in the center and is tightly connected to a bottom surface (13b) of the upper structure (13), a recess surface (528) is formed in a direction of the measuring portion (524), and the measuring sensor (40) is attached to the recess surface (528).

21. The remote center compliance device of claim 19, wherein the measuring portion (524) includes:
a recess (524a) formed under the fixing portion 522 and in which at least one force-insertion force measuring sensor (40) is provided; and
a protrusion (524b) formed in a periphery of the recess 524a.

* * * * *